United States Patent [19]

Butner et al.

[11] E Re. 30,964

[45] Reissued Jun. 8, 1982

[54] PACKAGE INSPECTION AND HANDLING SYSTEM

[75] Inventors: Dean C. Butner, Clemmons; Douglas C. Clark, Winston-Salem, both of N.C.

[73] Assignee: R. J. Reynolds Tobacco Company, Winston-Salem, N.C.

[21] Appl. No.: 125,727

[22] Filed: Feb. 28, 1980

Related U.S. Patent Documents

Reissue of:

[64] Patent No.: 3,939,984
Issued: Feb. 24, 1976
Appl. No.: 534,939
Filed: Dec. 20, 1974

[51] Int. Cl.[3] ..... B07C 5/02

[52] U.S. Cl. ..... 209/536; 209/597; 209/644; 198/347; 198/367; 198/442

[58] Field of Search ..... 209/535, 536, 552, 576, 209/587, 597, 644; 53/53, 543; 198/347, 358, 367, 442; 131/21 R, 21 B, 25

[56] References Cited

U.S. PATENT DOCUMENTS 2,536,756 1/1951 Lopez .
2,726,775 12/1955 Howard .
2,883,033 4/1959 Armstrong et al. .
2,991,879 7/1961 Innocenti ..... 209/597 X
3,420,392 1/1969 Flint .
3,481,107 12/1969 Andblad .
3,499,555 3/1970 Wahle ..... 198/347
3,565,249 2/1971 Codding .
3,616,901 11/1971 Groves .
3,805,477 4/1974 Kruse .

FOREIGN PATENT DOCUMENTS 43-110840 12/1968 Japan .

*Primary Examiner*—Joseph J. Rolla
*Attorney, Agent, or Firm*—Grover M. Myers

[57] ABSTRACT

A packaging handling system for detecting and rejecting faulty packages and for maintaining a packaging or boxing machine in operation for a specific period of time if one or the other goes down. The system comprises a plurality of photocell sensing units to detect the imperfectly formed packages and a [means for rejecting] *pneumatic rejection device* the faulty packages. An accumulator is positioned in the conveyor line between the packaging machine and the boxer and will store a limited number of packages should the cartoning machine discontinue to operate and will feed a limited number of packages on the conveyor should the packaging machine become inoperative. When the system is utilized on a boxer being fed by two packers, a distribution table is also provided in the system to divide the work from one packer to both lines should the other packer cease to function.

14 Claims, 25 Drawing Figures

PACKAGE INSPECTION AND HANDLING SYSTEM

Matter enclosed in heavy brackets [ ] appears in the original patent but forms no part of this reissue specification; matter printed in italics indicates the additions made by reissue.

BACKGROUND OF THE INVENTION

This invention relates to a system for inspecting and rejecting faulty packages and for maintaining a package handling system including a single cartoning machine being fed by two packaging machines in operation when either of the packaging machines goes down or the cartoning machine goes down. In particular, this invention relates to a system of inspecting cigarette packages for faults and maintaining a boxer or cartoning machine, which is being fed by two cigarette packers, in operation when one of the packers goes down or maintaining the packers in operation when the boxer goes down.

In the past, the cigarette industry has used boxes, as for example, the boxer or cartoning machine manufactured by Molins Machine Company, Ltd. (Molins) which receives packages fed along two conveyor belts from separate packaging units such as an American Machine and Foundry (AMF) packer. When using such a hook-up, an operator is required for each of the packers and an inspector is required for each conveyor line between the packers and the boxer to remove the packages with flaws or faults in their wrappers as well as to remove packages from the conveyor line when the boxer goes down or places packages on the conveyor if one of the packers goes down. Because of the other increasing speeds of the cigarette maker and packaging machines, it has become difficult for an inspector to keep up with the packer output; therefore, some faulty packages are getting through to the inspection point to market. In order to prevent this from happening, the present invention provides a system which will automatically inspect packages for the major faults which commonly occur and automatically reject imperfect packages. By eliminating the requirement of an individual to inspect the packages, it becomes necessary to develop a system which can keep the packers and boxers operating if one or the other goes down.

SUMMARY OF THE INVENTION

It is, therefore, an object of this invention to provide an apparatus which will inspect a package for faulty packaging and wrapper formation and reject improperly formed packages.

Another object of this invention is to provide an automatic package inspection system which can be used with high-speed packing machines.

Another object of this invention is to provide an apparatus which will permit either an interconnecting packer and boxer to go down and still allow the other machine to function for a specific period of time.

Another object of this invention is to provide an accumulator in the conveyor line between a packer and a boxer which will permit either the packer or the boxer to go down and still permit the other machine to function properly for a specific period of time.

Still another object of this invention is to provide a distribution apparatus which will receive a supply of packages from two separate packaging machines and, when one of the packaging machines goes down or operates at a lower rate than the other, to divide the work from the packer which remains in operation or divide the work from the packer running at the higher speed to the packer running at the lower speed so that the boxer apparatus can continue to function.

These and other objects are accomplished by the present invention through the use of a package/inspection/handling apparatus including a plurality of photocells arranged to detect imperfections of the package formation by either a change in reflected light levels or blockage of light to the photocell receiver units. The apparatus also includes an accumulator which is positioned in the conveyor line between a packaging machine and a cartoning machine to receive packages being produced by the packer when the cartoning machine ceases to operate or supply packages to the cartoning machine when the packer ceases to operate. The accumulator has a magazine which reciprocates vertically on the conveyor line to receive and deposit packages on the conveyor line. A distribution table is provided which will receive packages from two sources and distribute them into two channels if both of the sources are supplying packages at different rates or divide the packages from one source into the two output channels if only one source is providing the packages.

BRIEF DESCRIPTION OF THE DRAWINGS

The foregoing and additional objects, features and advantages of the present invention will be apparent to those skilled in the art from the following detailed description of a preferred embodiment taken with the accompanying drawings, in which.

DESCRIPTION OF A PREFERRED EMBODIMENT

Figure 1:
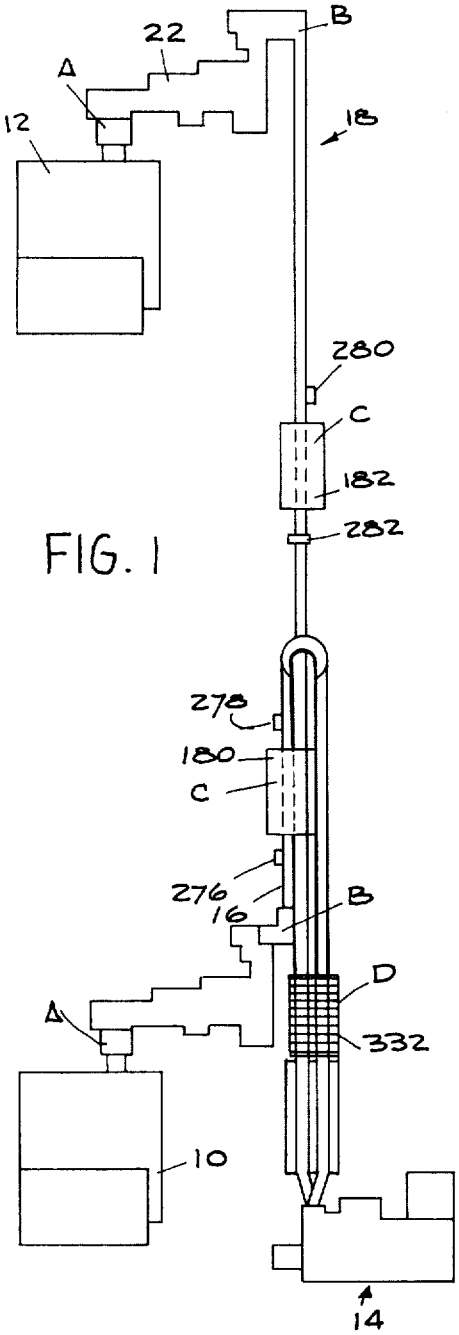
FIG. 1 is a plan view of the packaging and cartoning line in which an inspection device, accumulator and distribution table are installed in accordance with the present invention.

Referring more particularly to the drawings, FIG. 1 illustrates a plan view of a machine hook-up which can be utilized by the present invention and includes two existing packing machines 10 and 12 and a single boxer or cartoning machine 14. The packers can be, for example, cigarette packaging machines, manufactured by AMF while the boxer can be, for example, a cartoning machine manufactured by Molins which places ten packages of cigarettes in a carton having five units on an upper level and five units on a lower level. Attached directly to the packers 10 and 12, just prior to the beginning of conveyor lines 16 and 18 between the packers and the boxer, are wrapper machines 20 and 22, for example, units manufactured by Package Machine Company. The wrapper machines place a cellophane overwrap and tear string around the cigarette packages as they come off of the packers.

There are various kinds of imperfections which can occur in a package during the packaging operations. The system described herein is used for detecting faults in cigarette packages. It should be understood, however, that this system not only can be used for cigarette packages but other types of products which require a uniform package.

Figure 2:
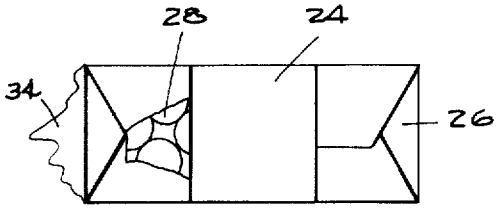
FIG. 2 is a top view of an improperly formed cigarette package.
Figure 3:
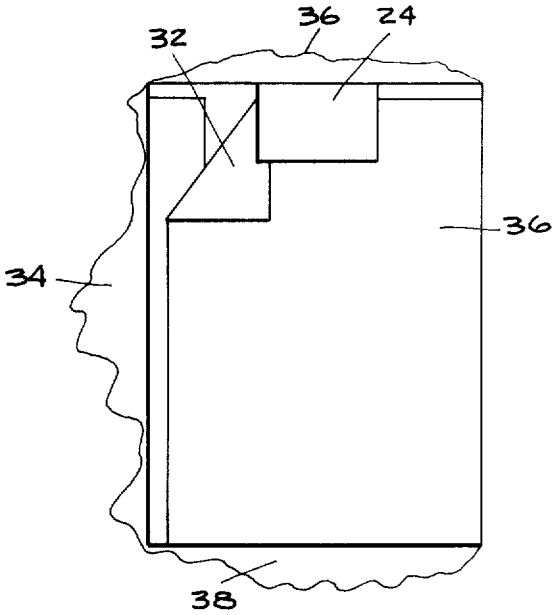
FIG. 3 is a side view of an imperfectly formed cigarette package.
Figure 4:
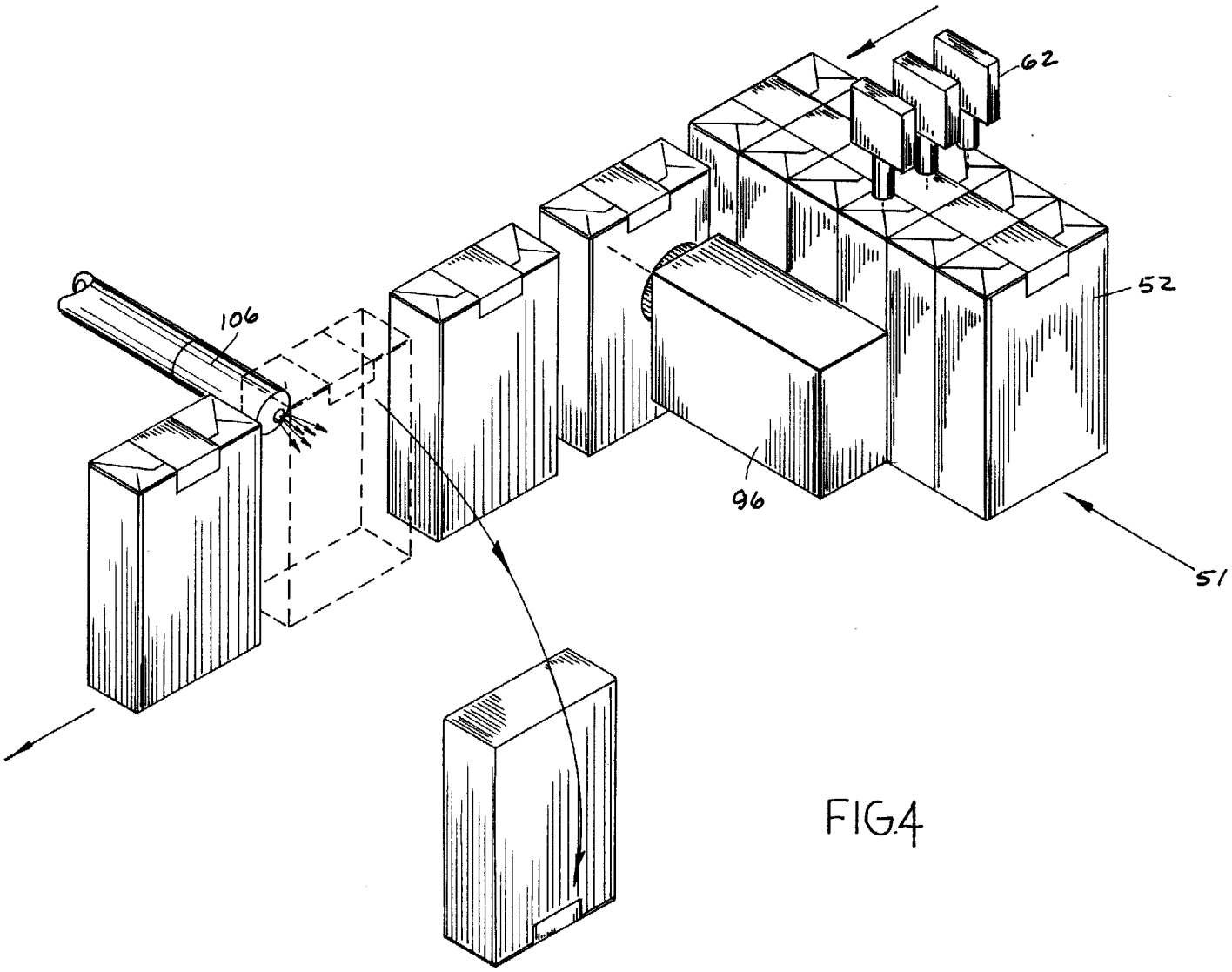
FIG. 4 is a perspective view of a package/inspection device according to the present invention.
Figure 5:
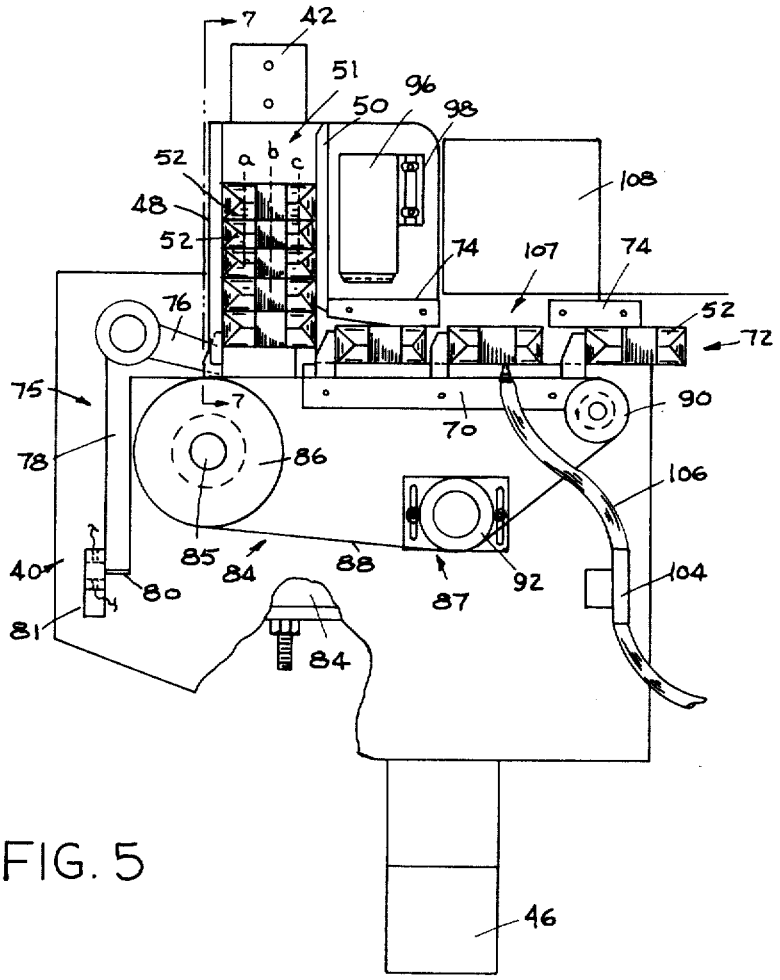
FIG. 5 is a plan view of the inspection device of FIG. 4 with the hold-down brush and inspection photocells shown in FIG. 6 and FIG. 7, respectively, removed for clarity.
Figure 6:
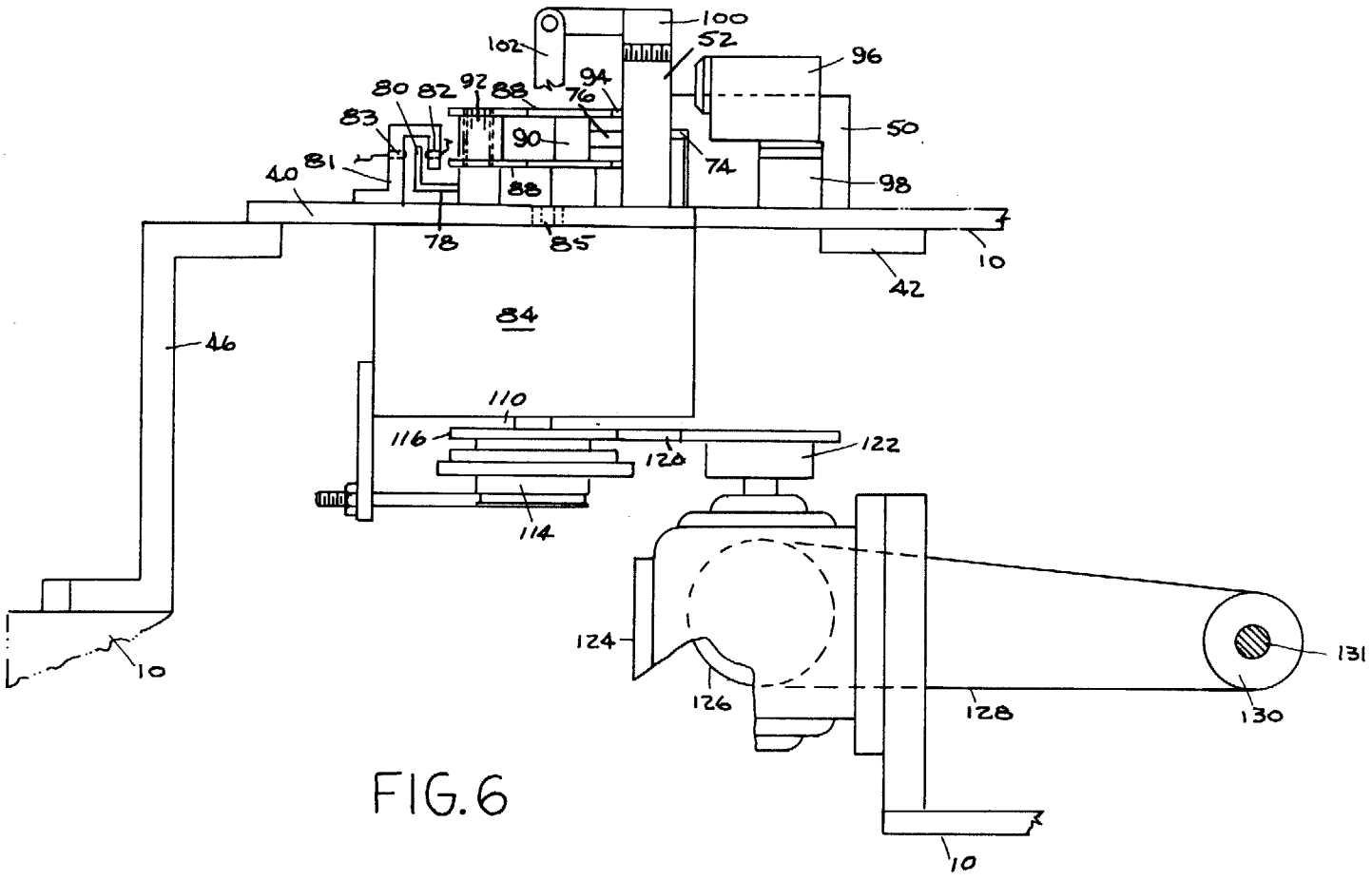
FIG. 6 is a side elevation view of the inspection device shown in FIG. 4.
Figure 7:
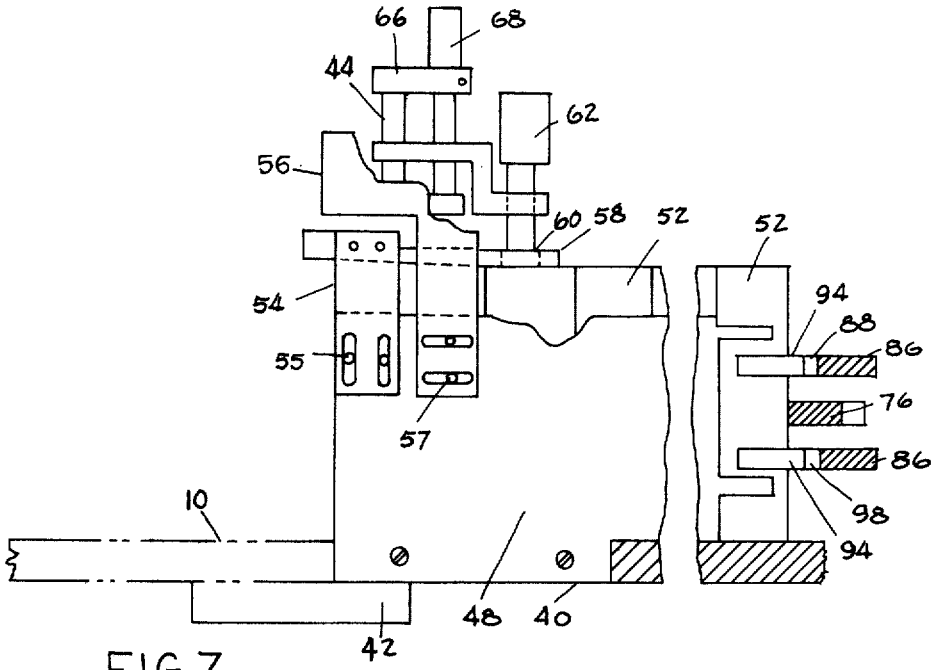
FIG. 7 is a side elevation and partial cross section view of the inspection device shown in FIG. 5.

With regard to the cigarette package, there are several imperfections in the package which appear to occur most frequently, particularly at the high speeds at which the packers are operated by the industry today. FIGS. 2 and 3 show a top and side view of an imperfectly formed cigarette package. One fault, which is not shown, is a missing closure strip 24. Previously, this closure strip was used as a tax stamp; however, in recent years, the tax stamping of the cigarettes has changed to indentations or decals, thus, the tax stamp has no longer been required for that purpose. Nevertheless, it has been found that smokers have a habit of tearing away a corner of the package to get to the cigarettes, leaving the closure strip in tact. Because of this habit of the smokers, the cigarette manufacturing industry has uniformly left the closure strip on the package because it still serves a useful function. Thus, if the strip is missing, it is a faulty package and such package should be rejected. The second fault occurs if the tension on the roll of foil being supplied to the packer is too great. In such an event, an insufficient amount of foil 26 is used on the package and opening 28 may occur adjacent the tax stamp. Also, during the folding operation of the foil, the foil may become torn and the openings can occur on either side of the closure strip 24. A third fault in forming a cigarette package can occur when applying the label to the package as illustrated in FIG. 3. On some occasions the upper left hand corner 32 of the package becomes folded back. This fault results because the corner of the label is slightly bent back as the label is applied and catches on the edge of the folding element of the packer. The label also may be placed on the package at an angle, thereby producing a gap between the side edges of the label.

It has also been found that many times the cellophane wrapper overwrap placed around the package is imperfectly formed. The major imperfections occurring when the cellophane wrapper is not properly sealed and the edges of the cellophane at the overwrap 34 on the left-hand side of the package as viewed in FIG. 3, and at the fold points 36 and 38, respectively, on the top and bottom of the package are loose.

As can be understood, most cigarette packages having a foil wrapper, a label, closure strip and cellophane overwrap could have these above-described faults, and they are the ones which appear to occur most frequently. Again, although the preferred embodiment of this invention is directed to a cigarette package, any package which has a uniform wrapper and repeated identical faults can utilize the present system.

Prior to the invention, in the hook-ups shown in FIG. 1, one operator X was required for each packer and wrapper, and an inspector Y on each conveyor line 16 and 18 between the packers 10 and 12 and the boxer 14. A single worker can usually handle several boxers. It is the package operator's X responsibility to keep all supplies, for example, the cigarettes, foil wrappers, labels, closure strips, tear strings and cellophane flowing smoothly to the packer and to correct malfunctions which produce stoppages of the packaging or wrapping machines. As can be understood, the speed at which the packers are operated today, the operator has no time to do anything but keep the supplies flowing smoothly to the packer. Therefore, these operators have no time to help with the inspection of the products. The inspectors Y are not only required to remove all the packages having the above-described faults, but they are also required to remove packages from the conveyor if the boxer goes down or deposits accumulated packages on the conveyor if the packer goes down to insure a continuous and smooth operation of the system. As the speed of the packers increases, the inspector's job gets more demanding and it is difficult for one person to function as an inspector over a long period of time. Thus, it has been necessary to automate the inspection function, and, by doing so, the inspector is available to perform other jobs. However, by removing the prime function of the inspector, it becomes necessary to automate the additional functions the inspector had in order to make the present system complete.

Package Inspection

The inspection of the package is accomplished at station A at the juncture of packers 10 and 12 and wrappers 20 and 22, respectively, and the inspection of the cellophane wrapper is accomplished at station B between wrappers 20 and 22 and conveying lines 16 and 18, respectively.

FIGS. 4, 5, 6 and 7 illustrate a package inspection station A which includes a mounting [palte] *plate* 40 having a connecting plate 42 that is connected to existing feed channels from the packer and a bracket 46 which is secured to the existing packer. At the entrance end of the inspection device, at the mounting plate 40 carries two vertical guide plates 48 and 50 which, along with the mounting plate 40, form a channel 51 through which the cigarette packages 52 are fed. Mounted above the channel on the guide plates are two brackets 54 and 56 (see FIG. 7). Bracket 54 can be vertically adjusted by bolts 55 and carries a cantilevered hold-down arm 58 which engages the top of the packages 52 as they pass along the channel. Hold-down arm 58 extends across the channel and has a tapered undersurface with a transverse row of apertures 60 near its free end. The brackets 56, which can be horizontally adjusted by fasteners 57, carry a plurality of photocells 62 which correspond to the member and are aligned with the apertures 60. The photocells are of the standard reflective type and are directed at the top of the packages 52 as they pass beneath them. The photocells 62 are secured within one leg of a generally Z-shaped member. The other leg of the Z-shaped member has an aperture through which a vertical post 64 extends. The vertical post 64 is secured to the bottom plate 65 of bracket 56 and has a plate 66 secured to its upper end. The plate 66 extends forward and has an aperture which receives a threaded adjusting post 68 which extends through a threaded aperture in the leg of the Z-shaped member and is seated in an aperture in the bottom plate 65 of the bracket 56. This arrangement permits the photocells to be adjusted vertically.

In this preferred embodiment, there are three photocells which are positioned so that the light source is directed against the top of the packages at points along lines a, b and c. A change in the reflected light intensity will produce an error signal which is sent to a rejection system for rejecting the improperly formed packages, as will be explained hereinafter. As can be seen, if a closure strip 24 is missing, the change in the light reflected will be picked up by the photocell along line b; however, if foil is missing or torn from the package, this fault will be picked up by the photocells positioned along lines a and c.

The packages successively force each other against a lever switch member 75 and a guide rail 70 which defines one side of a channel 72 that is perpendicular to channel 51. The other side of the channel 72 has a guide rail 74 which has a tapered front end to permit packages to easily be fed between the guide rails.

As mentioned above, when the packages 52 are forced into the channel 72, they engage a generally L-shaped switch member 75 which has a lever arm 76 integrally formed and at right angles to a lever switch arm 78. The L-shaped switch member 75 is pivotedly mounted on plate 40. The end of the switch arm 78 has a vertically extending tab 80 (see FIG. 6). Also mounted on plate 40 is a photocell bracket 81 in the shape of an inverted hook. Photocell light source 82 and receiving unit 83 are carried in the bracket 81. When a package 52 engages and rotates lever arm 76, switch arm 78 is also rotated and tab 80 passes between the light source and receiver unit. Upon interruption of the light source to the receiver unit, a signal is sent from the receiver unit to a control circuit for an intermittent motion device 84 which senses a Ferguson indexing unit mounted on the underside of the mounting plate 40. The indexing unit 84 has one shaft 85 extending up through the plate 40 to drive a chain conveyor system 87 which is mounted on the plate 40 (see FIG. 5). The shaft 85 carries a double sprocket 86 which is surrounded by a pair of chains 88 that also encircle two other double sprockets 90 and 92 which are also mounted on plate 40. Sprocket 90 is mounted near channel 72 and is so positioned that the chains 88 will travel parallel to the edge of the guide rail 70 and channel 72 between sprockets 86 and 90. Sprocket 92 is positioned between sprocket 86 and 90 and its mounting can be adjusted to maintain a proper tension on the chains 88. Each chain 88 has a plurality of lugs 94 spaced along their lengths which engage the packages as they enter the channel 72 upon operation of the L-shaped switch member 75 which controls the operation of indexing unit 74 driving the conveyor system 87.

Positioned adjacent the channel 72 opposite the conveyor system 84 is another photocell 96 which is secured to the mounting plate 40 by a bracket 98. The photocell 96 is directed at the upper portion of the package to detect a screwed label or bent corner. If a defect in the package exists, photocell 96 will produce an inner signal which will activate the reject system to remove the faulty package from the conveying line, as will be explained hereinafter. A brush 100 (see FIG. 6) is carried on a post 102 and will pivot over channel 72 so that the brush engages the top of the packages as they pass along the channel. The brush is used to keep the packages stable as they pass through the channel. An electrically operated air solenoid valve 104 is secured to plate 40 and has a tube 106 which extends from the valve to a point adjacent the channel 72. The air solenoid valve 104 is operated by the reject system so that, when a faulty package passes in front of the tube 106, a blast of air forces the package from the channel through link 72 into a chute 108 through a gap 107 in guide rail 74.

The indexing unit 84 has another drive shaft 110 which carries a sprocket 112 and a clutch. Sprocket 112 is surrounded by a chain 120 and, in turn, surrounds another sprocket 122 mounted on the shaft of a right-angle gear box 124. A sprocket 126 carried on the shaft of the right-angle gear box is engaged by a chain 128 which engages a sprocket 130 on an existing power shaft 131 of the packer unit. There are many ways in which the inspecting station can be driven. However, this embodiment disclosed herein is the most preferred.

Figure 8:
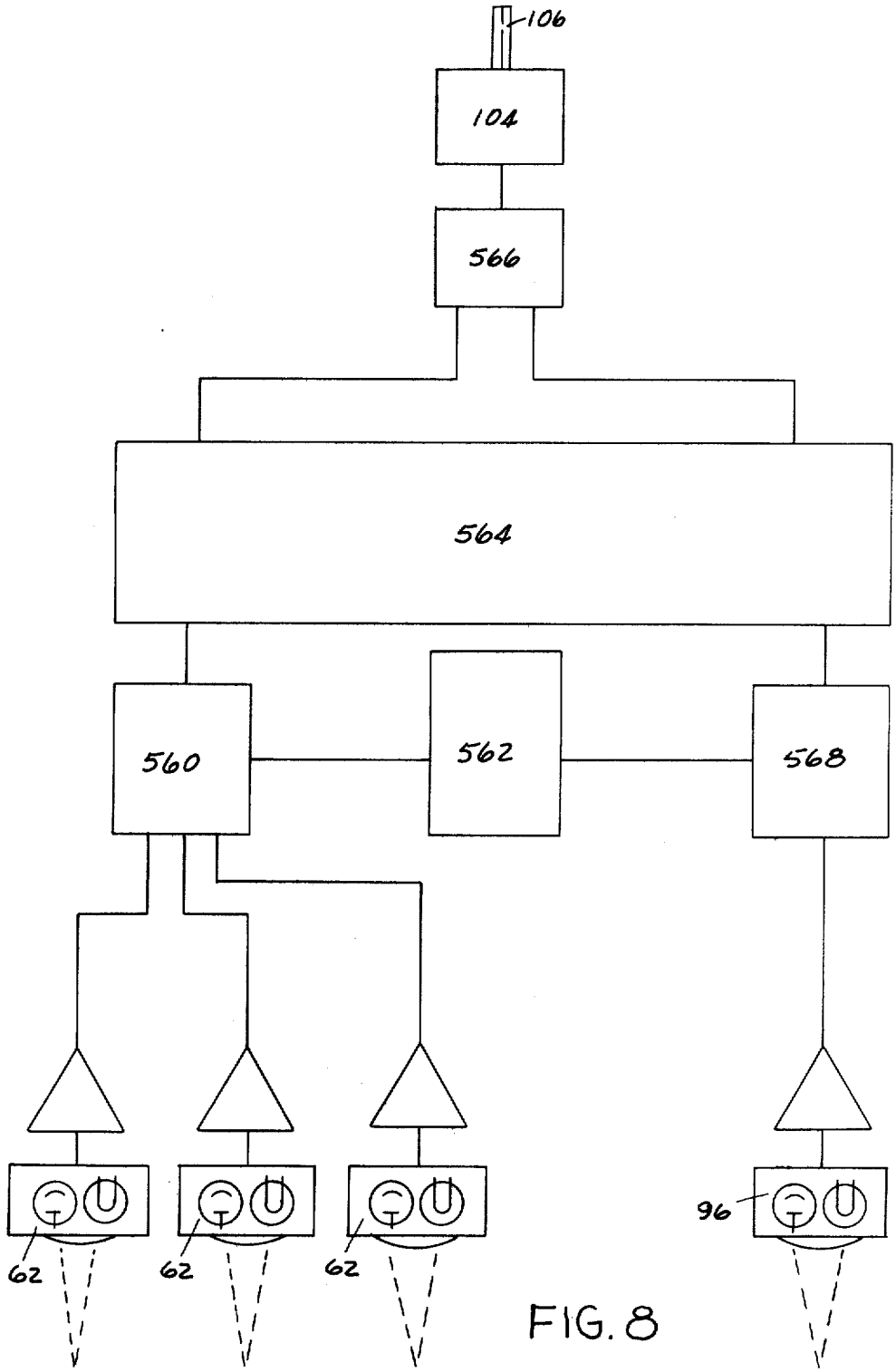
FIG. 8 is a block diagram of the package inspection electronic circuit according to the present invention.
Figure 9:
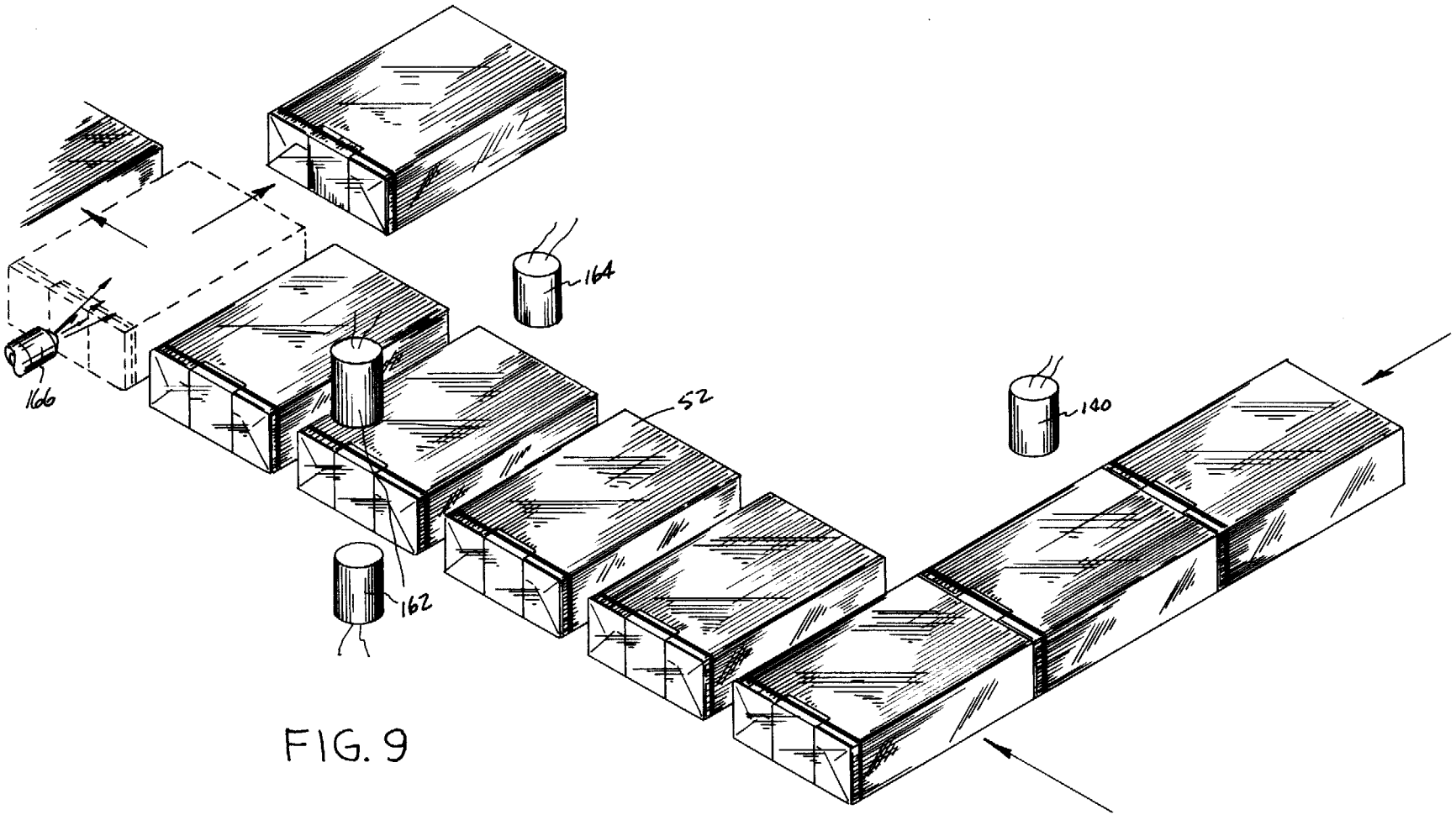
FIG. 9 is a perspective of a package wrapper inspection device according to the present invention.
Figure 11:
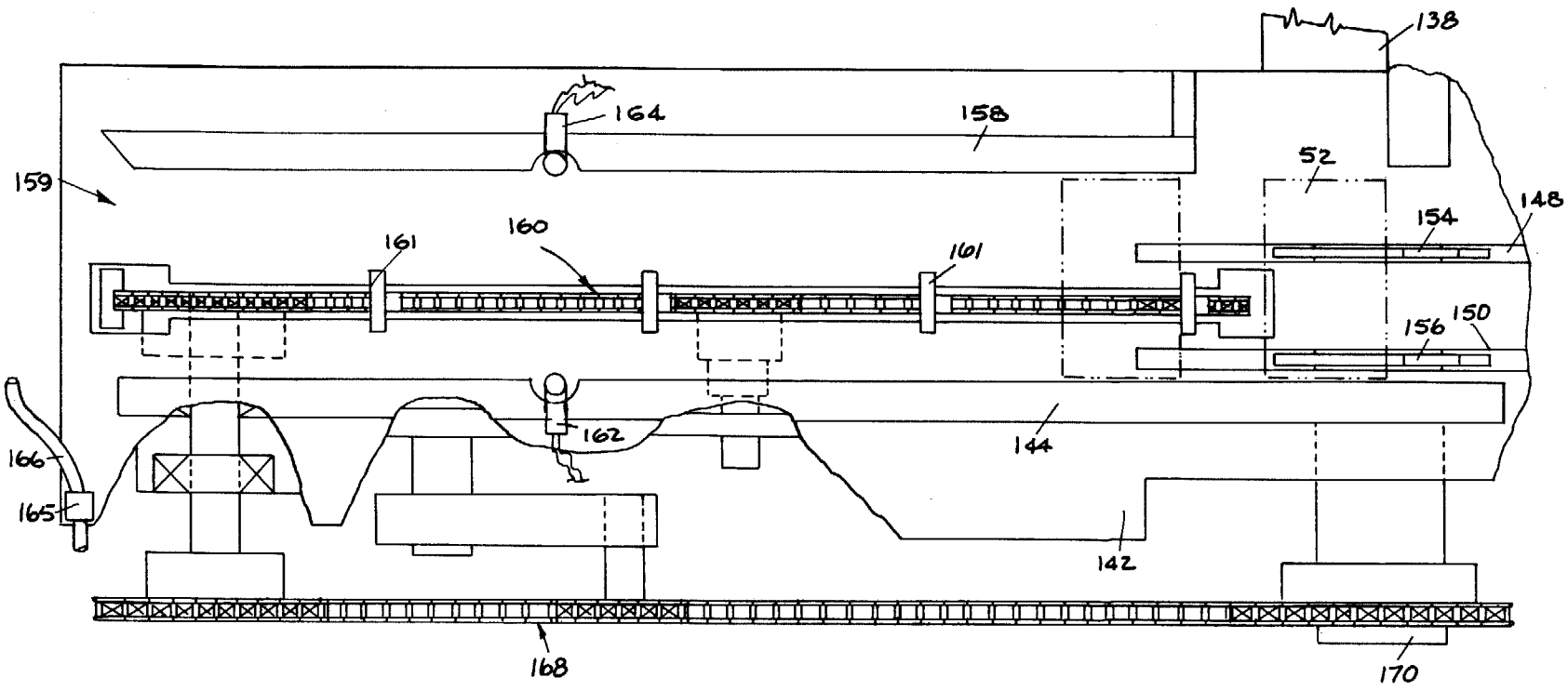
FIG. 11 is a top view of the wrapper inspection device according to the present invention.
Figure 12:
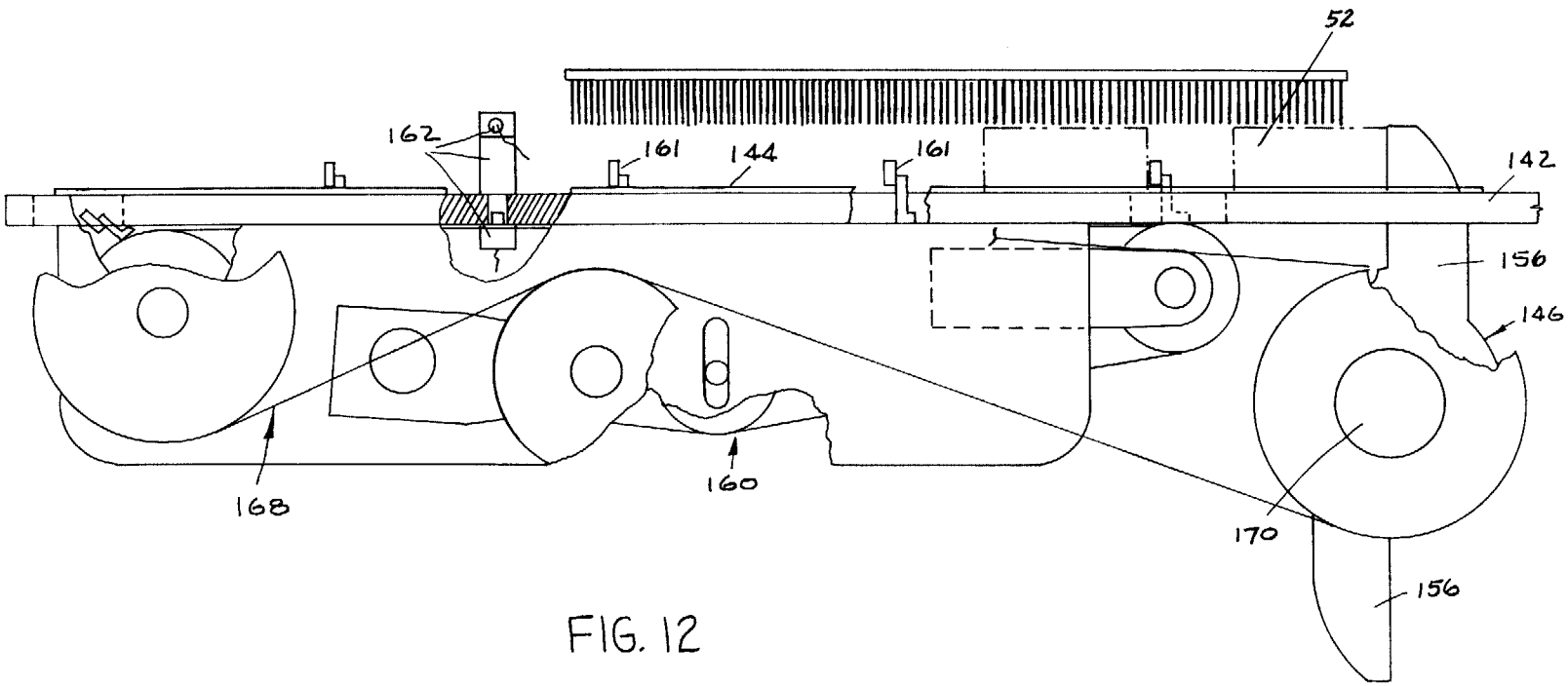
FIG. 12 is a side elevation view of the overwrap inspection device according to the present invention.

Turning now to the sequence of events which causes the operation of the package inspection system. As mentioned above, the package inspection system photocells 62 are mounted above the entrance channel 51 to inspect the top of the packages. They are reflective type photocells and detect changes in level of light reflected from an object. If a change in light level is detected, an error signal is sent from the particular photocell to its respective amplifier where the error signal is amplified and passed into a logic gate 560 (see FIG. 8). A logic gate also receives a strobe or counter pulse of a strobe generator 562 and, if the error signal and counter pulse are coincident, an output signal is sent from the logic gate into a memory circuit 564. In this preferred embodiment, the memory circuit delays any output signal for four counter pulses and then sends a reject signal to a reject relay 566. The reject relay provides a signal to the electrically operated air solenoid valve 104 which operates to provide a blast of air to blow the improperly formed packages out of the conveying line. Another photocell 96 which is also a reflective photocell, in this particular embodiment, detects a change in color variation on a particular portion of the package and sends another signal when such variation occurs through an amplifier to a second logic gate 568. The second logic gate also receives a strobe pulse from the strobe generator 562. Then when an error signal and the strobe pulse are coincident, a signal is sent from the logic gate to the memory circuit 564. Again, the memory circuit relays the output signal, but in this particular case, only one count and then sends it to the reject relay 566 which operates the air solenoid valve 104. It should be understood that the placement of the photocells and the particular imperfections they will detect is dependent on the type of package being inspected and the most frequent imperfections on that type package.

Wrapper Inspection

Figure 10:
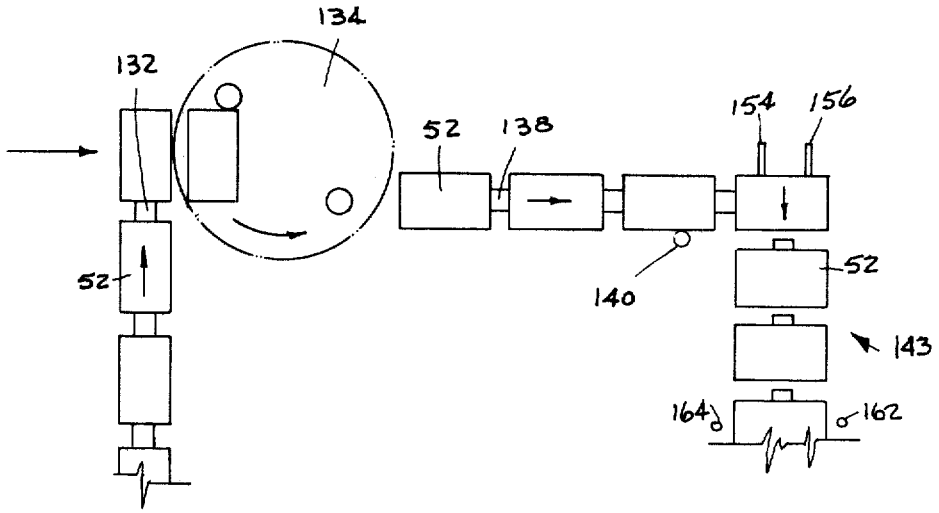
FIG. 10 is a plan view of the conveyor system used to connect the package wrapper machine and the wrapper inspection device.

FIGS. 9, 10, 11, 12 and 13 illustrate a package wrapping inspection station positioned at b as mentioned above. The station is located between the wrappers 20 and 22 and the conveyors 16 ad 18, respectively. The packages 52 have a cellophane overwrap applied thereto which is heat-sealed on the ends and one side of the package by the wrapper machine. The packages continue down an existing conveyor 132 (see FIG. 10) and are pushed onto an existing turntable 134 by an existing pusher mechanism. The turntable 134 rotates the packages 180° so that they exit off of the turntable on existing conveyor 138 with their heat-sealed side to the left, as viewed in FIG. 10. Located adjacent to the conveyor 138 and having a line of sight alignment contiguous to the sealed side of the packages is a photocell 140 having a light source and receiver unit above and below the package. The photocell unit will detect improperly formed packages, such as the improperly sealed side edge 34, shown in FIG. 3. Since the cellophane passes between the light source and receiver unit of the photocell, there will be a change in the light intensity level received by the receiver unit which will, thus, operate the rejection system. The packages 52 continue along the conveyor 138 and are received on a base plate 142 of the wrapper inspection system 143 (see FIGS. 11 ans 12). The packages are stopped by engaging a guide rail 144 on the inspection unit. Kicker arms 154 and 156 on a kicker wheel 146 are rotated through slots 148 and 150 in the base plate 142 of the inspection unit. The kicker arms 154 and 156 engage the packages 52 and push them perpendicular to the direction of the conveyor 138, as can be seen in FIG. 10. A guide rail 158 along with guide rail 144 and plate 142 form a channel 159 through which the packages are passed. In the center of the channel is a conveyor chain or mechanism 160 which has a plurality of lugs or dogs 161 carried thereon to engage the packages and carry them through the channel. A pair of photocells 162 and 164 are positioned on opposite sides and adjacent the channel 159. Each of these photocells has a light source and a receiver unit which are positioned above and below the packages, respectively. These photocells operate similarly to the photocells unit 140. If a defect in the cellophane wrapper, such as those shown in FIG. 3, at 36 and 38, is present, there will be a change in light intensity level which will send an error signal to the reject system. As the packages are moved down the inspection device towards the conveyor 16 or 18, an electrically operated solenoid valve 165, having a tube 166 extending from the valve to a location adjacent the conveyor, it is operated at the proper time so that the defective packages are blown off the conveyor. The leg chain mechanism 160 and the kickers wheels 146 are driven through a sprocket and chain mechanism 168 which is slaved to the existing drive shaft of the conveyor belts 16 or 18 through shaft 170.

Figure 13:
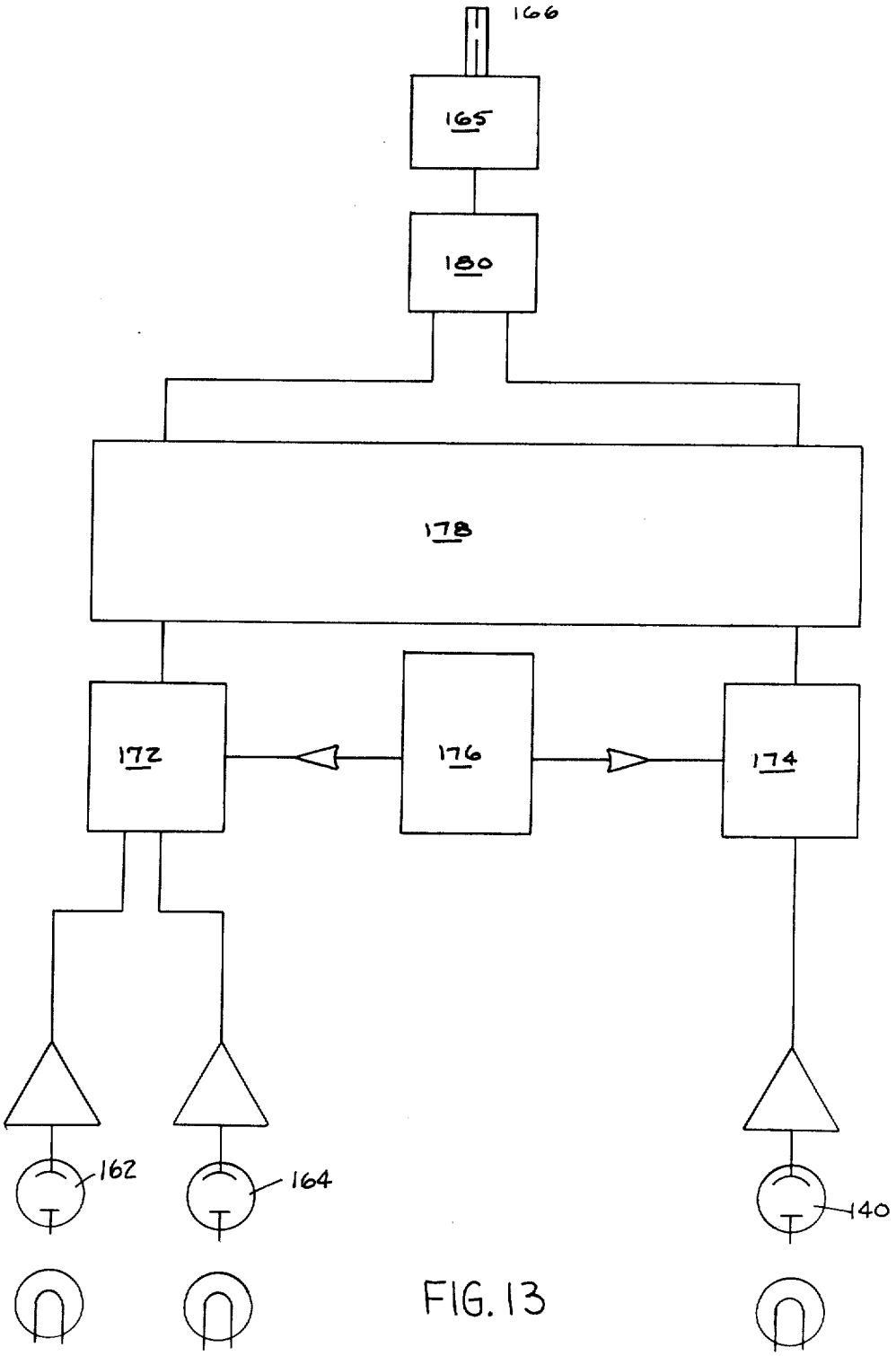
FIG. 13 is a block diagram of the electronic circuit for the wrapper inspection system according to the present invention.
Figure 14:
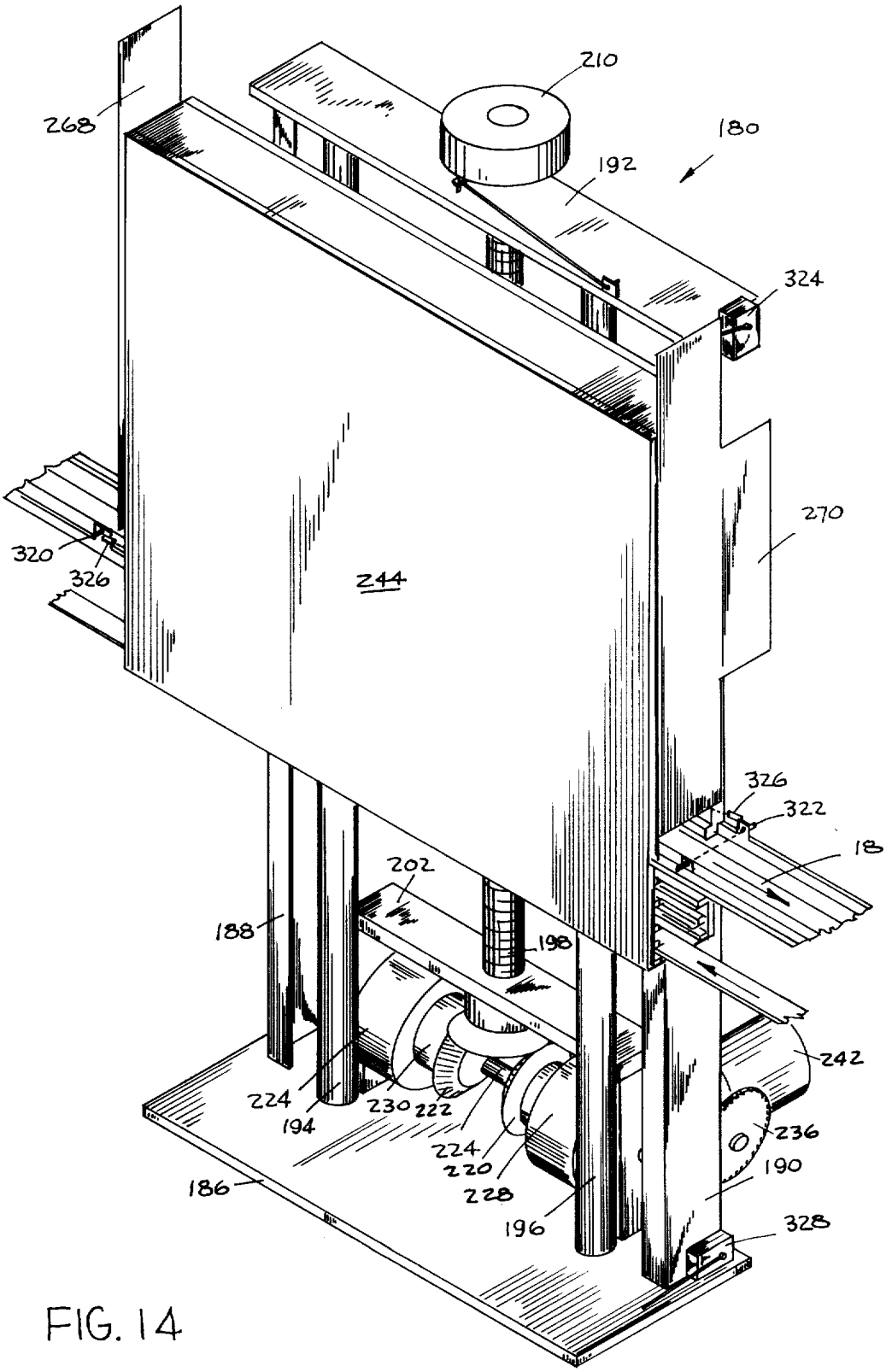
FIG. 14 is a perspective view of a package accumulator in a partially filled position according to the present invention.
Figure 15:
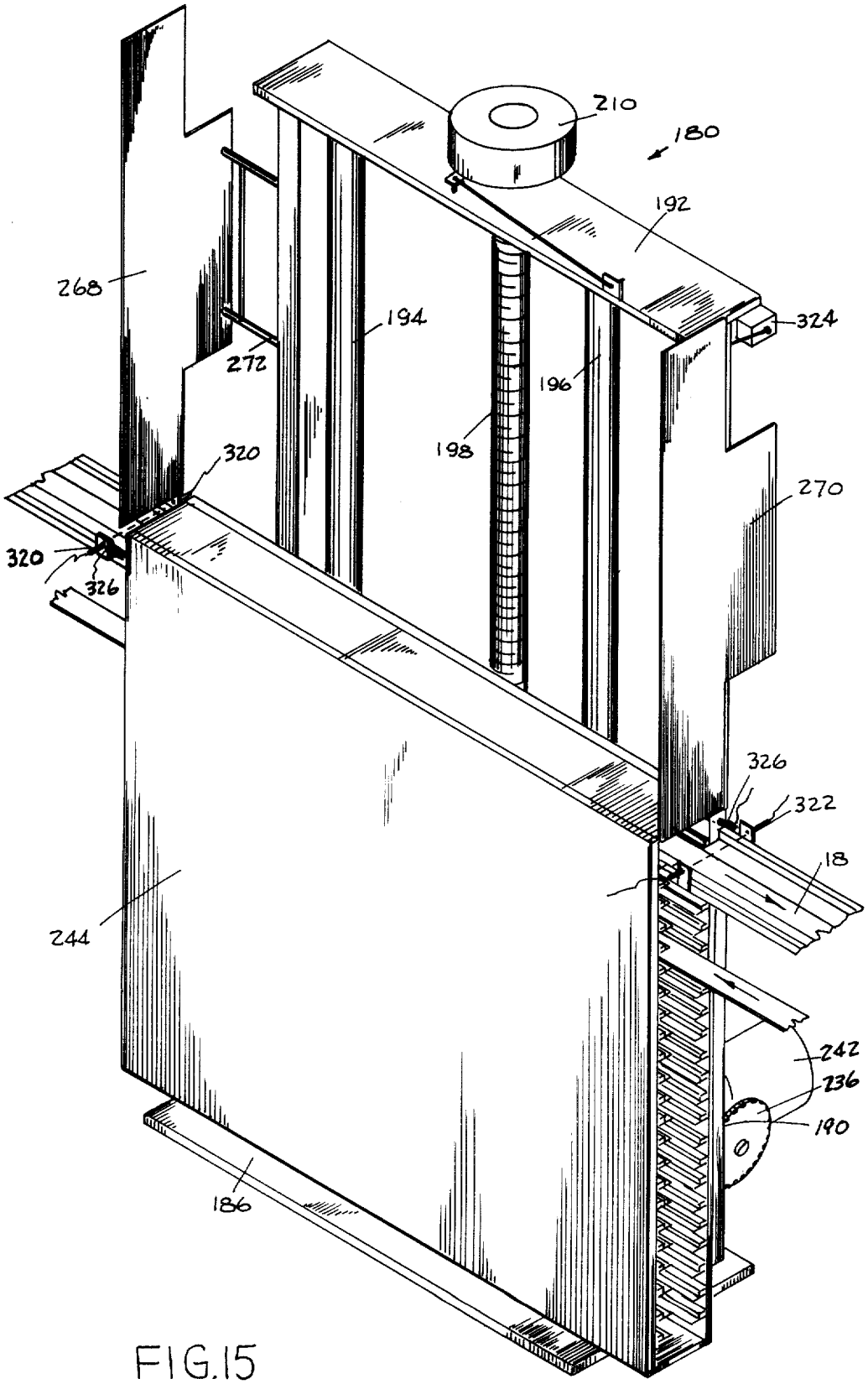
FIG. 15 is a perspective view of a package accumulator in an empty position.

The cellophane wrapper inspector operates similarly to the package inspection, as can be seen in FIG. 13. However, the photocells used in this wrapper inspection system are a light source and receiver type. When the level of intensity of the light source of unit 140, 162 or 164 is changed, indicating that the cellophane wrapper on the package is improperly formed in some respect, the respective receiver produces an error signal which is sent through its respective amplifier to a logic gate 172 or 174. The gates also receive a strobe or counter pulse from a strobe generator 176 similar to the package inspection system. When the error signal and the counter pulse enter the gates coincidentally, a signal is sent from the gate to a memory circuit 178. In this particular embodiment, the memory circuit delays the output signal from the side cellophane inspection photocell 140 six strobe pulse counts while an output signal from one of the end cellophane inspection photocells 162 and 164 is only delayed for two strobe pulse counts. In either case, the signal from the memory circuit 178 is sent to the reject relay 180 which energizes the electrical solenoid valve 165 which causes the improperly formed packages to be blown off of the conveyor line. Again, it should be understood that the position of the photocells is dependent on the type of package being inspected and the most frequent imperfections on that type package.

Accumulator

After the rejected packages are removed, the cigarettes continue down the conveyors 16 and 18 to accumulators 180 and 182, respectively (see FIG. 1). The accumulators are utilized to deposit packages on the conveyor in the event either of the packers 10 or 12 is shut down and the boxer continues to operate or to remove packages from the conveyors if the boxer 14 shuts down and the packers continue to operate.

A preferred embodiment of the accumulator is illustrated in FIGS. 14–20. The accumulators 180 and 182 have a base plate 186 and a pair of upright channel frame members 188 and 190. Channel frame members support an upper plate 192 which extends between the top ends of the uprights. Within the space between the uprights are two vertical guide posts 194 and 196 which are fixedly secured between base plate 186 and top plate 192. Located in the center of the space between the upright channels is a threaded post 198 which extends from the upper plate 192 to a bracket 200 having a top plate 202 and upright side plates 204 and 206 that are secured to the bottom base plate 186. The threaded post 198 is journaled by a flange bearing 208 in the upper plate 192 and extends into a brake device 210. The lower end of the threaded post carries a thrust bearing [112] *212* fitting on top plate 202 with the shaft of the threaded post extending through a roller bearing 214 carried in an aperture 216 in plate 202. Keyed to the end of the threaded post shaft is a bevel gear 218. The bevel gear 218 meshes with a pair of bevel gears 220 and 222 which are at right angles to it and are carried on a shaft 224 which extends through the upright side plates 204 and 206 and is suitably journaled therein. Also carried on the shaft 224 adjacent the bevel gears 220 and 222 are electric clutches 228 and 230. A sprocket 232 is carried on the shaft 224 outside upright plate 204 and has a chain 234 which encircles it and a sprocket 236 carried on the output shaft 238 of a reduction gear unit 240 which is carried on base plate 186. The reduction gear unit is driven by a motor 242. A magazine 244 is positioned adjacent the frame upright 188 and 190. The magazine has an upper and lower bracket 246 and 248, respectively (see FIG. 16) which carries linear bushings 252. The guide posts 194 and 196 extend through the linear bushings of the upper and lower brackets. A central bracket 254 positioned at approximately the mid-section of the magazine has a threaded collar 256 through which threaded post 198 extends. The magazine 244 is generally rectangular in shape, having a hollow center through which conveyor belt 16 or 18 passes. The magazine has two side plates 258 and 260, a top and bottom plate 262 and 264, respectively. Formed on the opposite side pieces 258 and 260 of the magazine are a plurality of ridges or protrusions 266 which extend inwardly into the space within the magazine and form gaps through which the conveyor belts may pass. The protrusions or ridges 266 can be integrally formed with the side piece or can be secured by angles to the side wall. The magazine's width is sufficient to permit a package 52 carried on the conveyor belt to pass therethrough without obstruction. The protrusions 266 extend into the space a sufficient distance to permit the edges of package 52 to be engaged by the protrusion 266 if the conveyor belt is removed from under the package, thereby permitting the package to rest within the magazine on the protrusion. There is a gap 267 between each level or flight of protrusions so that the magazine can be moved upwardly or downwardly with respect to the conveyor belts. As can be seen in the drawings, the magazine is in the down position when it is empty and it is filled by moving upwardly with respect to the conveyor and accumulator frame. When the accumulator is empty (see FIG. 14) or if the accumulator is not being used, the magazine is positioned so that the surface of conveyor 18 is slighty above the upper surface of the protrusions at a particular flight whereby the packages 52 can pass through the magazine without engaging the protrusions.

Figure 16:
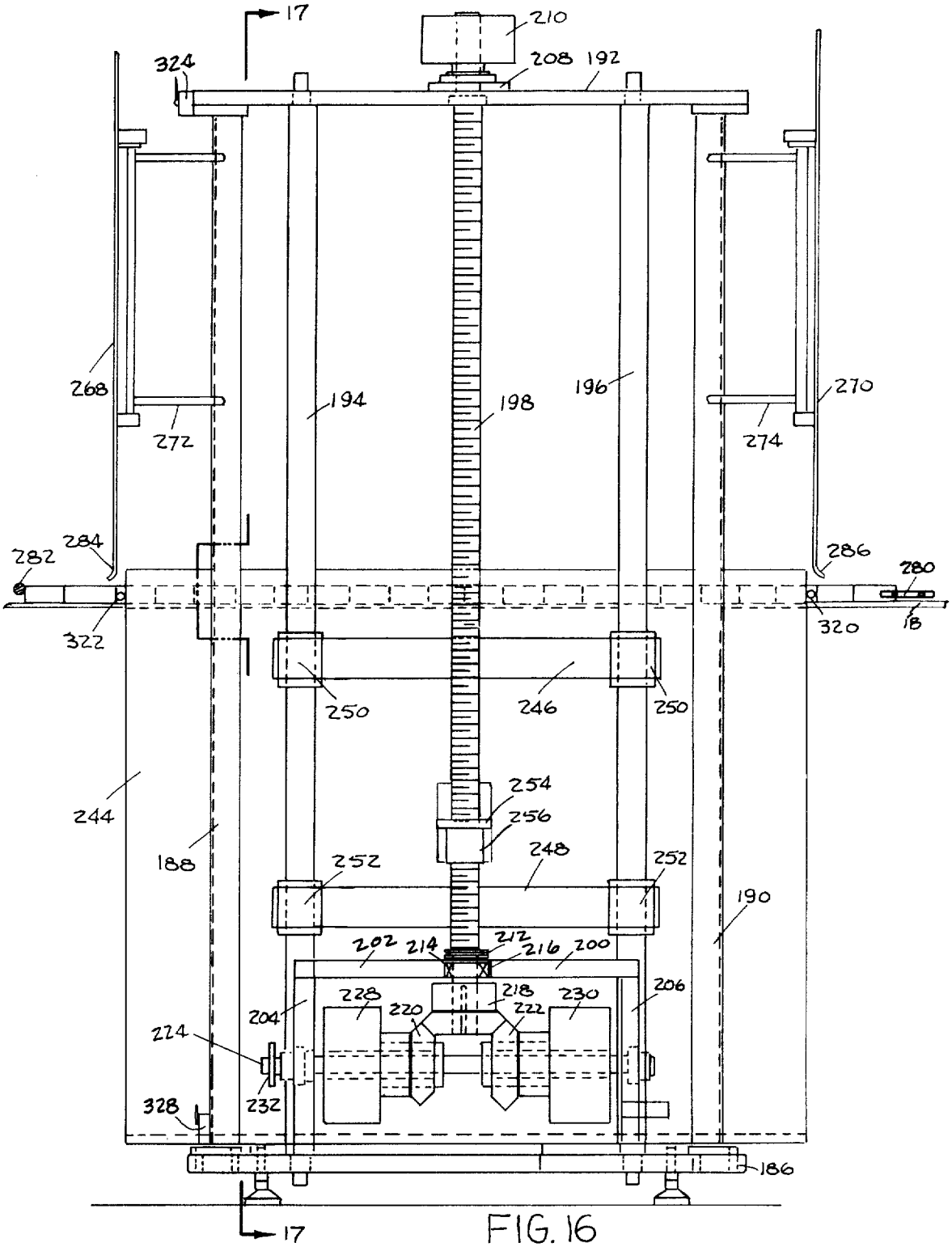
FIG. 16 is a side elevation view of an accumulator according to the present invention with the magazine in the empty position and the accumulator drive motor removed for clarity.
Figure 17:
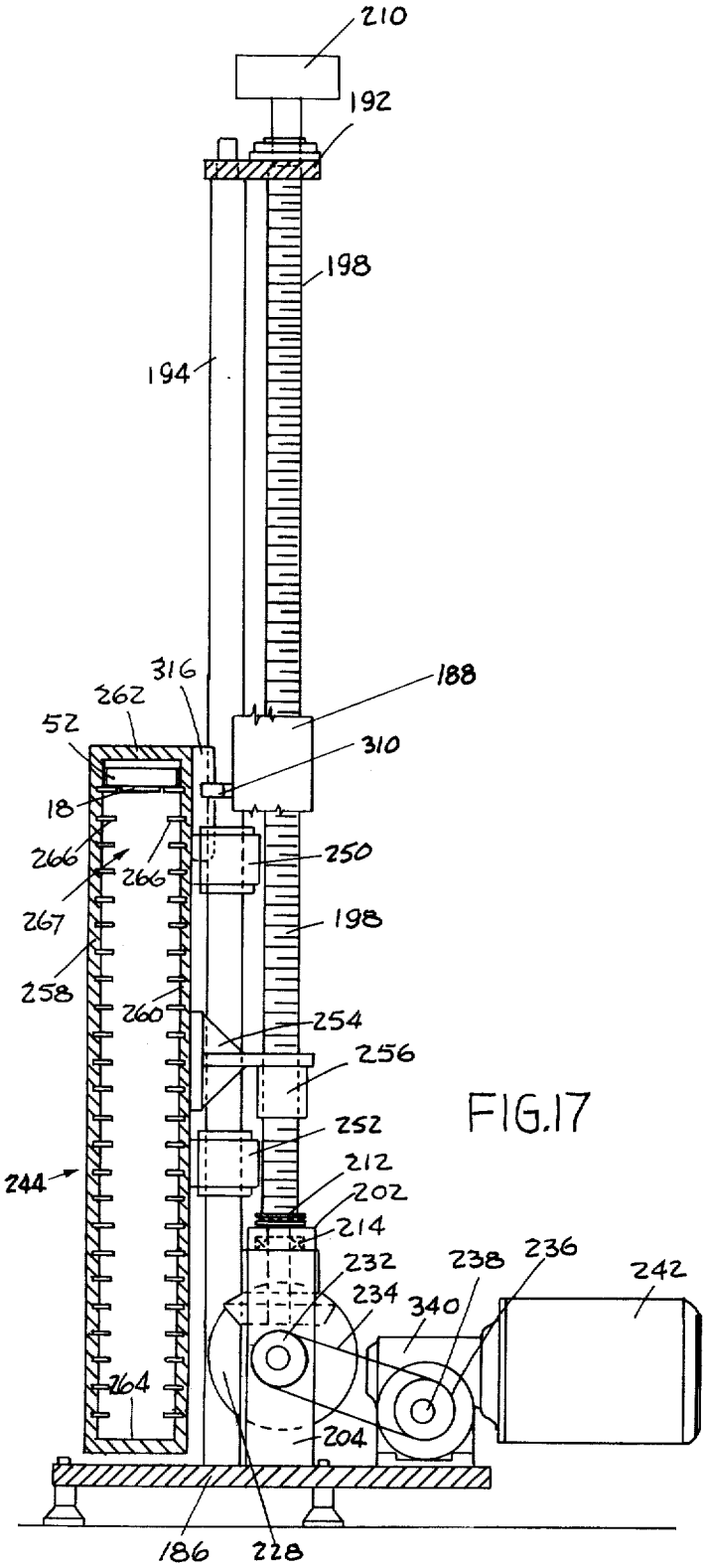
FIG. 17 is a cross-sectional view taken along Lines 17—17 of FIG. 16.
Figure 18:
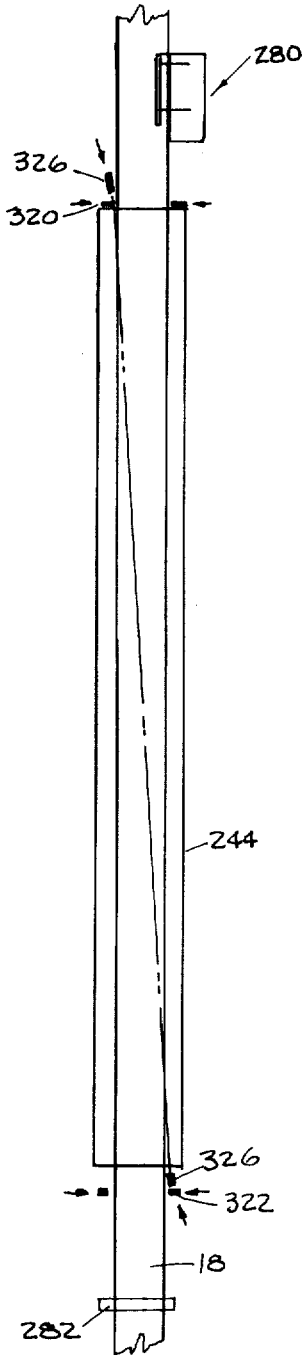
FIG. 18 is a detailed view of the control system associated with the accumulator according to the present invention.

If the cartoning machine or boxer 14 goes down and the packer 10 continues to operate, the magazine will move upwardly to permit the packages to be deposited on the various flights. As can be seen in FIG. 16, when the magazine moves upwardly, the sides of the magazine pass end plates 268 and 270 which are pivotedly mounted by brackets 272 and 274 to frame members 188 and 190. The side members are utilized to hold the packages within the magazine as the magazine moves upwardly. On the other hand, if the packages go down, the magazine moves downwardly to deposit the packages on the conveyor until the packer is operating again or the magazine supply is depleted.

Positioned on the conveyors 16 and 18 before and after the accumulators 180 and 182 are lane stops 276, 278, 280 and 282 (see FIG. 1). The lane stops 276 and 280 are positioned prior to the entrance end of the accumulators and can be located at any desired distance away from the entrance. These stops are only used when the accumulator is unloading to hold the work and prevent it from passing into the accumulator when the packer goes down. The lane stops 278 and 282 are at the exit end of the accumulators and operate only during the loading cycle of the accumulator. These exit stops are positioned a specific distance from the inside surface of end plate 286. The stops are positioned an exact number of package widths, normally two or three, from the inside surface of the end plate so that, as the magazine of the accumulator moves up, the edge of the end packages on a filled flight will coincide with the inside surfaces of the end plates. As can be seen in FIG. 16, the length of the magazine is slightly less than the distance between end plates 286 and 270. The end plates are positioned so that the inside surfaces are spaced a specific number of pack widths apart so that, as the magazine moves up, the edge of the last pack entering the magazine will coincide with the inside surface of the end plate 270. Each of the end plates 268 and 270 have curved lower edges 284 and 286, respectively, to aid in guiding the end packages between the end plates and also to engage the adjacent packs outside the magazine and prevent them from riding up as the magazine moves upwardly.

Figure 20:
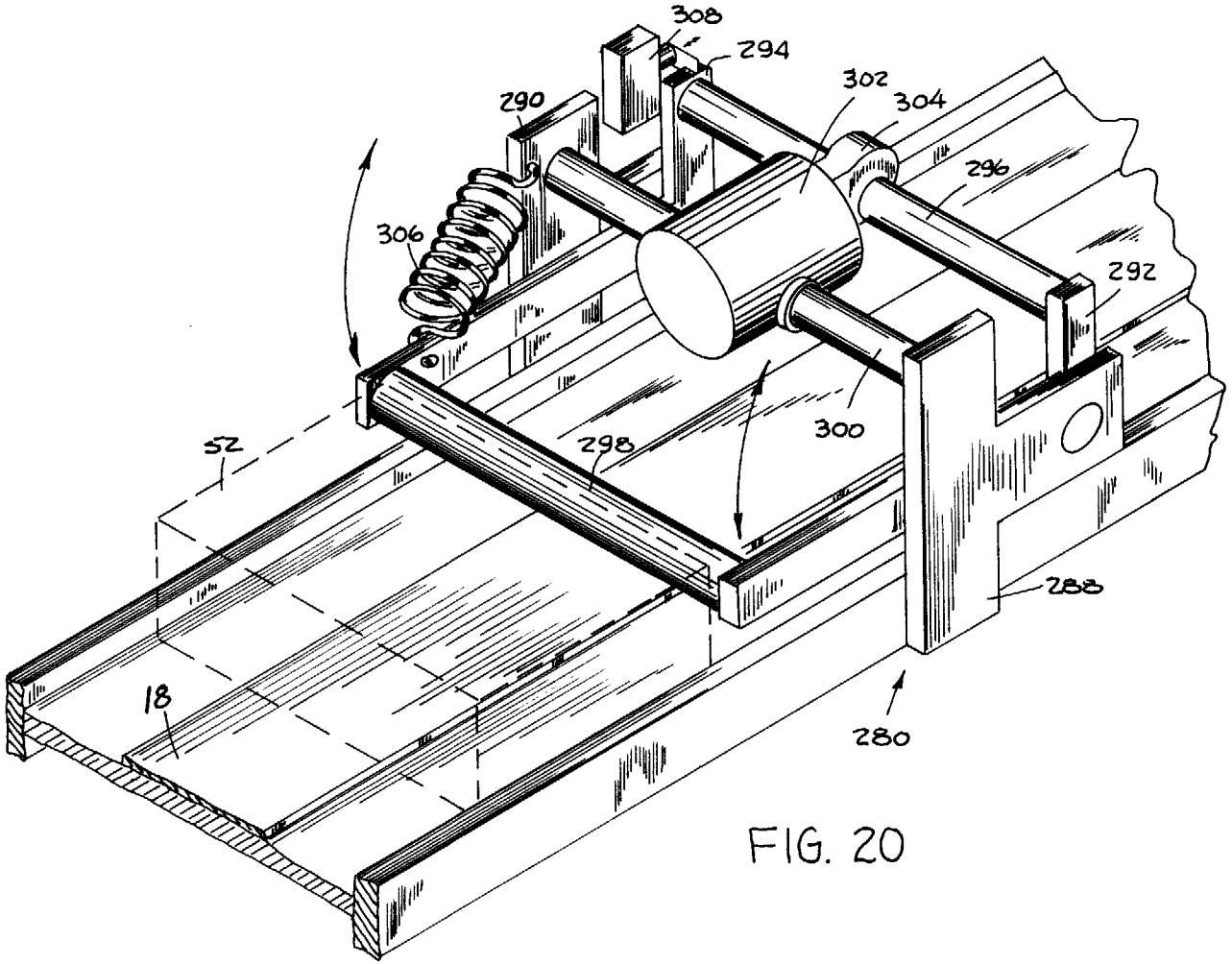
FIG. 20 is a detailed perspective of a positioning lane stop associated with and located beyond the exit end of the accumulator according to the present invention.

An exit lane stop 280 is illustrated in detail in FIG. 20. The lane stop has a pair of T-shaped side plates 288 and 290 which are secured on opposite sides of the conveyor frame. A pair of L-shaped arms or plates 292 and 294 are pivotedly secured at the juncture of a set of legs to each T-shaped plate 288 and 290. The short leg of the L-shaped plate is positioned upwardly and a bar or rod 296 extends between the two L-shaped plates 292 and 294 across the conveyor 18. A roller bar 298 extends between the long legs of the L-shaped plates adjacent their ends. Another bar is secured between the T-shaped plates above the conveyor and carries an electrically operated solenoid 302. The solenoid core 304 is secured to bar 296. A compression spring 206 is attached between T-shaped plates and the long leg of the L-shaped plates so that the end of the L-shaped plates are pivotally upward, thereby positioning the roller bar 298 normally above the conveyor. When the solenoid 302 is energized, the core 304 is drawn inwardly, thus pivoting the roller bar downwardly to block the conveyor lane. The lane stop remains down as long as the solenoid is energized. Upon operation of the lane stop when the roller bar is completely down, a switch 308 is closed to provide a signal to the accumulator control circuit. The entrance lane stops 276 and 280 are of the pinch-bar type which includes a spring-loaded solenoid unit having a bar which is attached to the solenoid core which will be moved outwardly into the conveyor's path and pinch the packages against the opposite side of the conveyor frame when the solenoid is energized.

Figure 19:
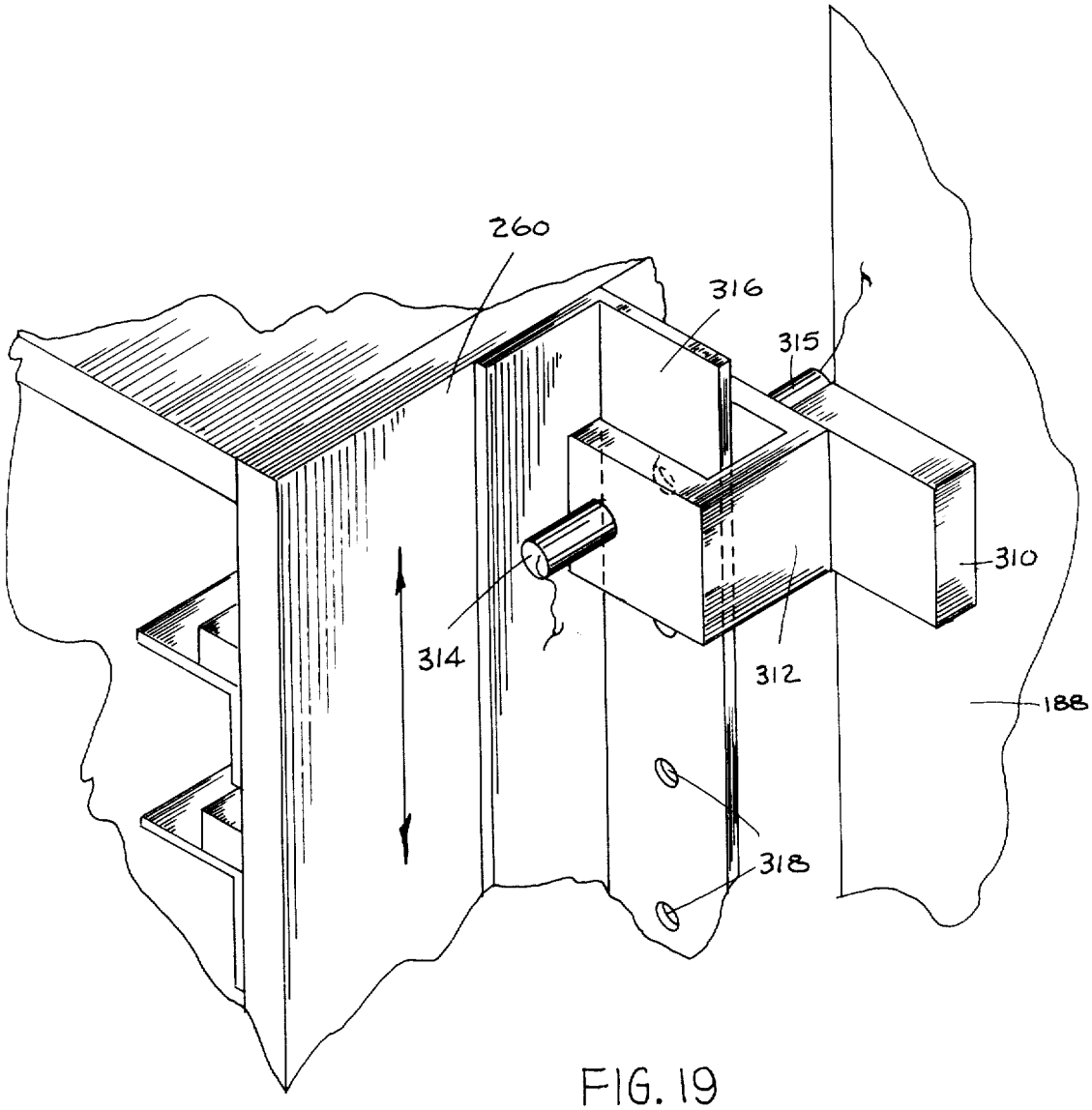
FIG. 19 is a detailed view of the magazine level sensing unit for the accumulator.

The device used to properly position the magazine at the appropriate flight is illustrated in FIG. 19. A bracket 310 is secured to frame member 190 and has a channel portion 312 which carries a photocell light source 314 and receiver unit 315. An angle 316 is secured to plate 260 of the magazine 244 and extends the length of the magazine from the top to the bottom. One leg of the angle passes through the channel portion 312 of the bracket 310 and has a plurality of apertures 318 spaced along its length. The vertical center lines of the apertures are on the same vertical line and coincide with the line of sight position of the photocell light source and receiver units. A horizontal center line of apertures coincides with the top surface of the protrusion 266 on each flight. This device acts to stop the magazine at each flight level. For example, at any particular flight position, the beam of the photocell unit sees through the flight aperture 318 of angle 316. When the magazine is moved upwardly or downwardly to load or unload a flight, the beam between the light source and the receiver unit is blocked by the angle 316. As the magazine moves to the next flight level, the light beam passes through the next adjacent aperture, and at this point, a signal from the photocell unit is sent to the appropriate circuit to stop the magazine 244. The circuitry for operating this flight level control system will be explained hereinafter.

Turning now to the operation of the accumulator, there are three different cycles for the accumulator operation; and, since each accumulator functions in the same manner, only one will be described.

First, there is a dwell cycle; next, the load cycle; and, finally, an unload cycle. During the dwell cycle, both the packer 10 or 12 and the boxer 14 are operating. Therefore, the accumulator is not functioning and the packages pass through the magazine on the conveyor belts without obstruction.

The load cycle is activated if the boxer 14 goes down and the packer continues to run. When this event occurs, a signal is sent to the exit lane stop 282, causing it to operate. The roller bar 298 on the lane stop permits any packages caught under the bar to pass and will fall in between the next spacing of packages coming down the conveyor. When the roller bar 298 is down, a switch 308 is closed, thus, activating the accumulator load circuitry which includes a timer that is energized. The packages begin backing up through the magazine on the conveyor and block the line of sight communication between the photocell unit 322 at the exit end of the accumulator and photocell 320 at the entrance end of the accumulator. Each of these photocells is a light source receiver type having the light source on one side of the conveyor with the receiver on the other side. The timer is provided to insure that there are no groupings of packages passing the photocell 320 at the entrance to block the light source for a sufficient period of time to operate the system before the magazine flight is full. After the time delay and blockage of photocells 322 and 320 have occurred, the up clutch 230 is energized and the brake 210 is de-energized. As the magazine 244 of the accumulator moves upwardly, the control of the accumulator transfers from the photocells 320 and 322 circuitry to the circuitry for the photocell 314 carried on bracket 312 on the accumulator frame (see FIG. 16). As mentioned above, the angle 316 passes between the light source and the receiver unit of photocell 314 blocking the light signal to the receiver. As the next adjacent aperture 318 coincides with the line of sight alignment of the photocell, the receiver unit is again activated to send a signal to de-energize the up clutch 230 and energize the brake 210. This sequence described above is repeated until either the boxer begins operation or all the accumulator flights become full. If the boxer begins to operate again, a signal from the boxer is sent to the control system to terminate the accumulator sequence since the conditions for operation of the load cycle no longer exist. A time delay is provided to insure that any load cycle in progress at the time of the signal from the boxer is completed before the accumulator operation is terminated. If the accumulator magazine becomes full and the limit switch 324 located on plate 192 is contacted, a signal is sent to the packer to shut it down.

The conditions required to initiate an unload cycle of the accumulator are the packer ceasing operations while the boxer continues to function. When these conditions exist, the entrance lane stops either 276 or 280 are operated to pinch and prevent any stray packages from passing into the accumulator. Another photocell unit 326 is provided for utilization in the unload cycle. This photocell unit has a light source and receiver unit positioned at opposite ends of the magazine with a line of sight looking diagonally through the magazine (see FIG. 18). When no packages are passing through the accumulator, the photocell 326, having its light source and receiver unit on opposite ends of the accumulator magazine, will have line of sight contact. The receiver unit will send significant light from the source for a specific period of time to produce a signal to operate the accumulator down controls. When the photocell 326 sees clear, the signal is sent to energize the down clutch 228 and deenergize brake 210, thereby causing the magazine 244 to begin moving downwardly. As during the load cycle, the controls for the accumulator transfer from photocell 326 circuitry to the photocell 314 circuitry. Again the angle 316 blocks the light from the receiver unit as it passes through the bracket 312. As the next adjacent aperture 318 passes the line of sight alignment of the photocell 314, a signal is sent to the clutch 228 to de-energize it and energize the brake 210. The packages on a particular flight on which the magazine stops are then removed from the flight by the conveyor. Again, a time delay is provided to insure clearance of a flight and, when the photocell 326 has line of sight contact through the magazine, this sequence described above is repeated.

The unload cycle continues until either the packer continues operating again or the accumulator is empty. If the packer begins operating again, a time delay is provided to permit the accumulator to complete an unload cycle and then the accumulator is stopped on an empty flight and ceases to function, thus, the packages from the packer are carried through an empty flight by the conveyor. If the accumulator magazine becomes empty and operates a lower limit switch 328, a signal is sent to the accumulator controls to discontinue the unload cycle.

In the two packer/one boxer arrangement illustrated in this preferred embodiment, if the accumulator is unloaded, the boxer does not necessarily shut down as does the packer when the accumulator is full. In this preferred embodiment, the distributor table 332 operates to divide the work from the one functioning packer to the two lanes of the boxer to permit it to continue to function as will be explained hereinafter.

Distribution Table

Figure 21:
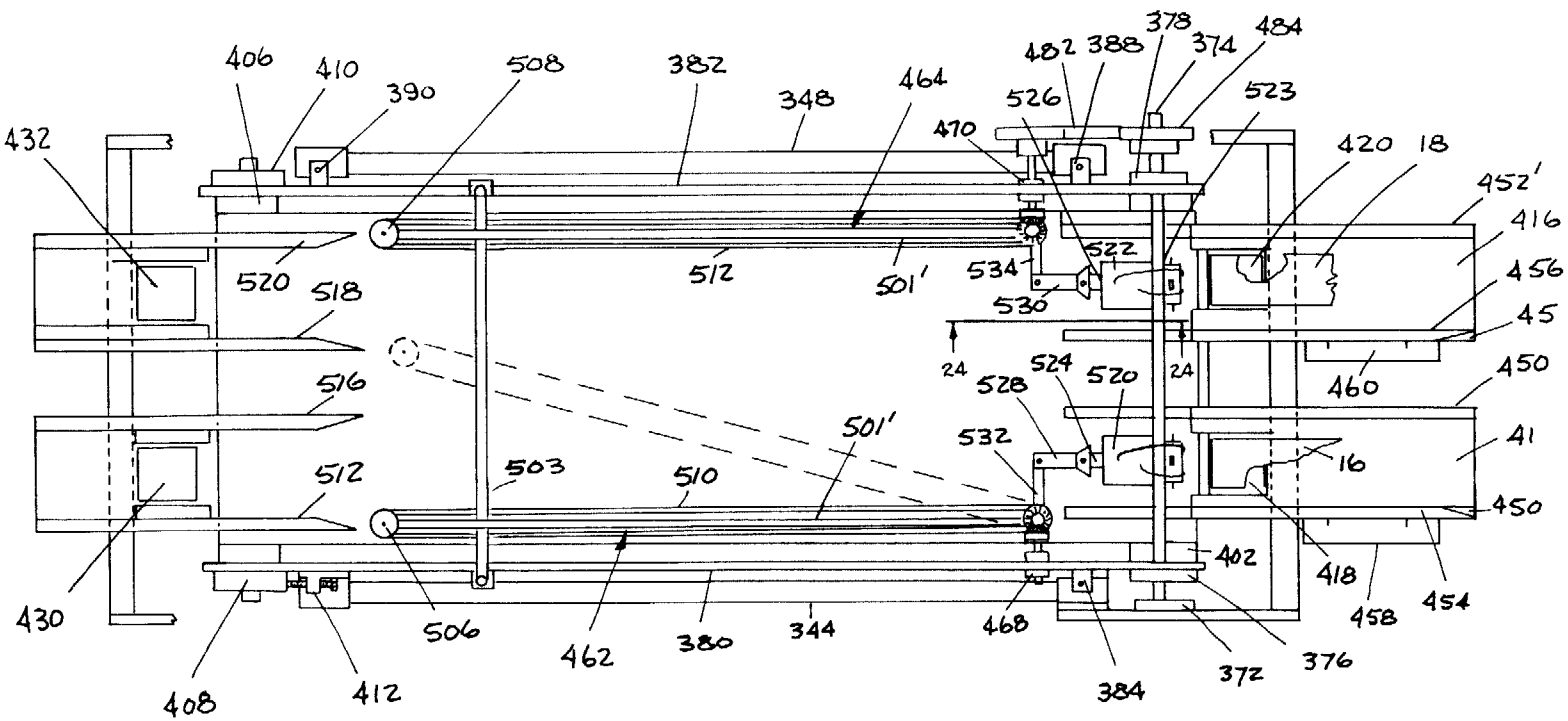
FIG. 21 is a top view of a distribution table utilized in the package handling system according to the present invention.
Figure 22:
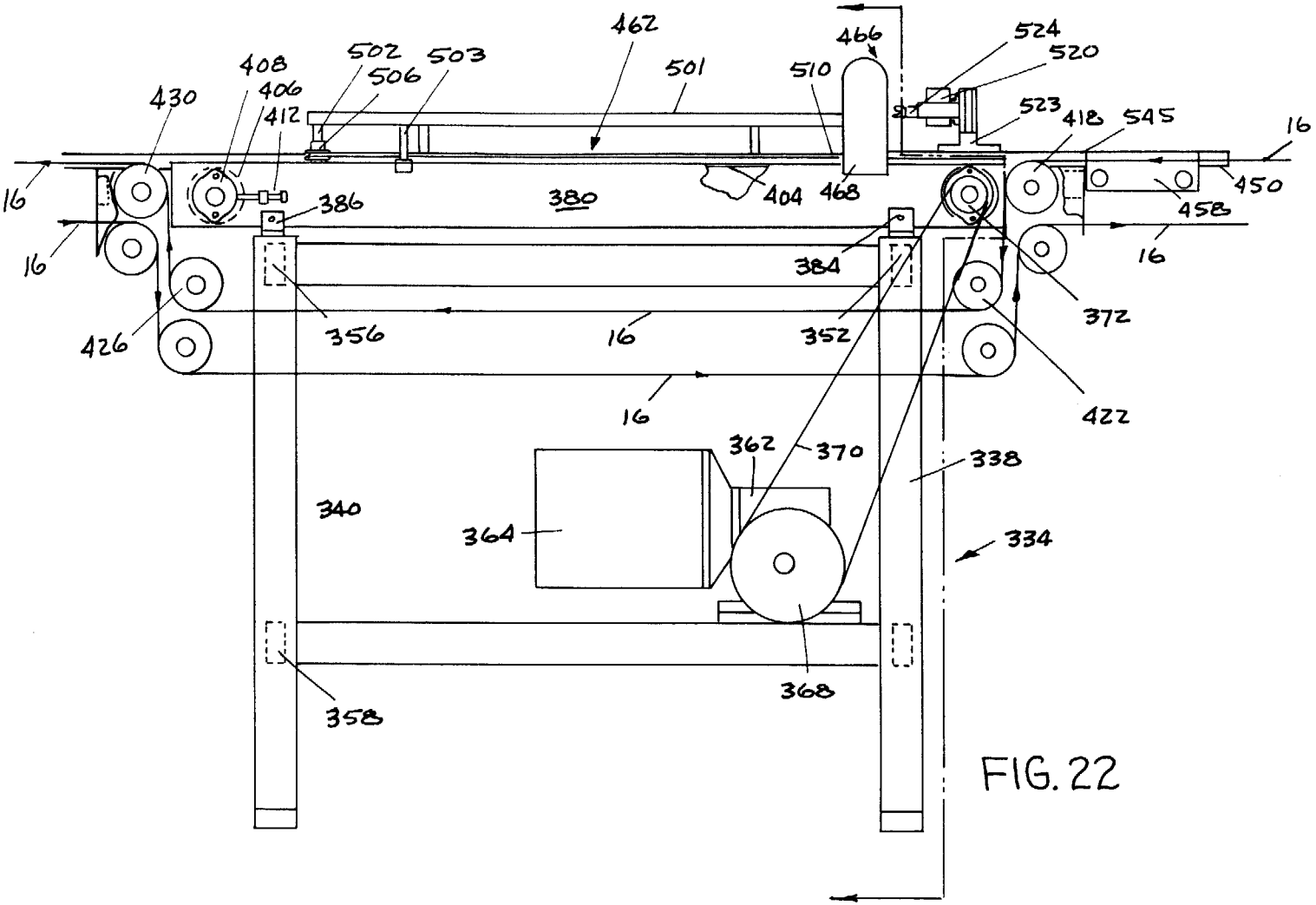
FIG. 22 is a side elevation view of the distribution table shown in FIG. 21.
Figure 23:
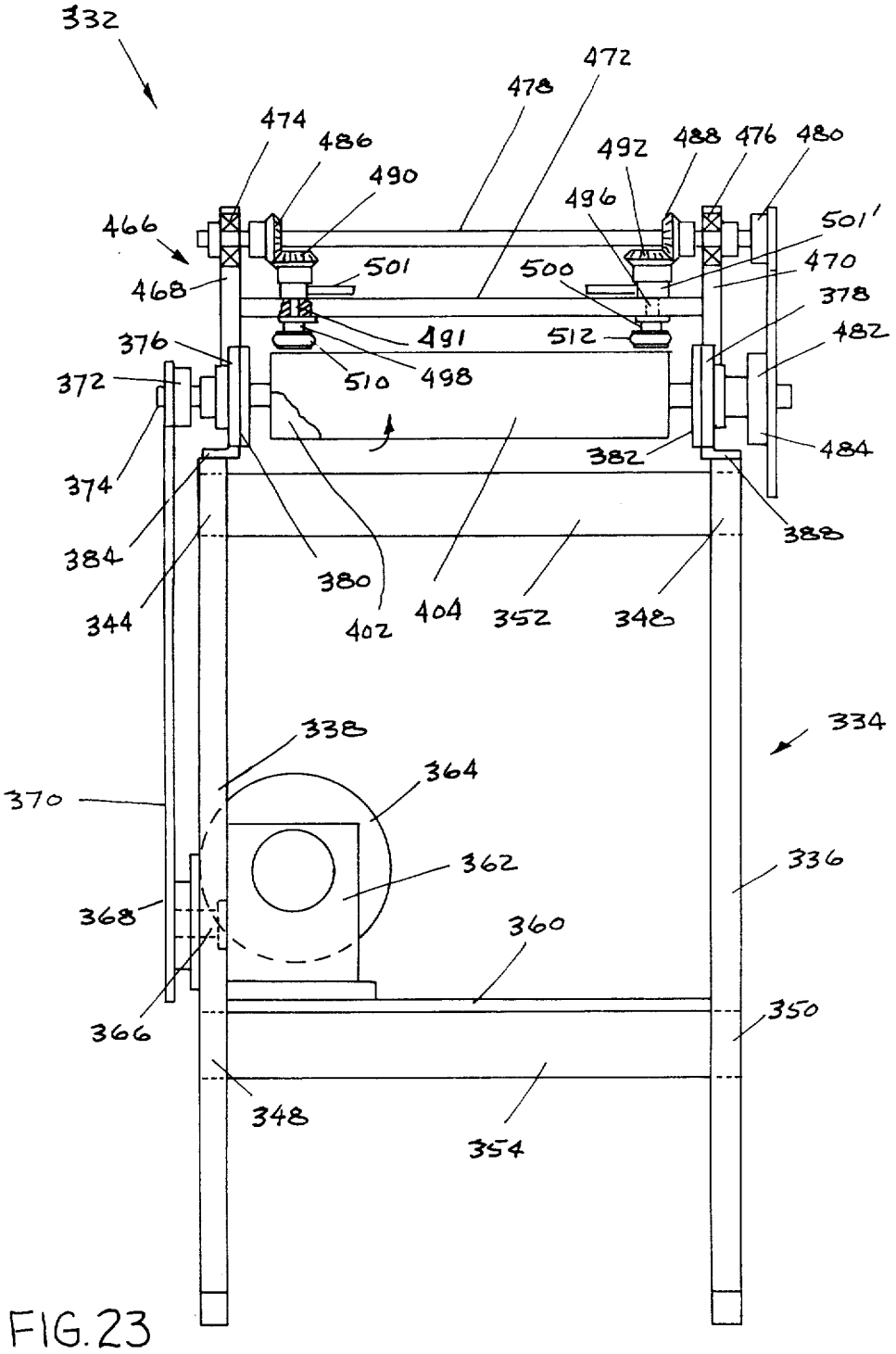
FIG. 23 is a cross-sectional view taken along Lines 23—23 of FIG. 22.
Figure 24:
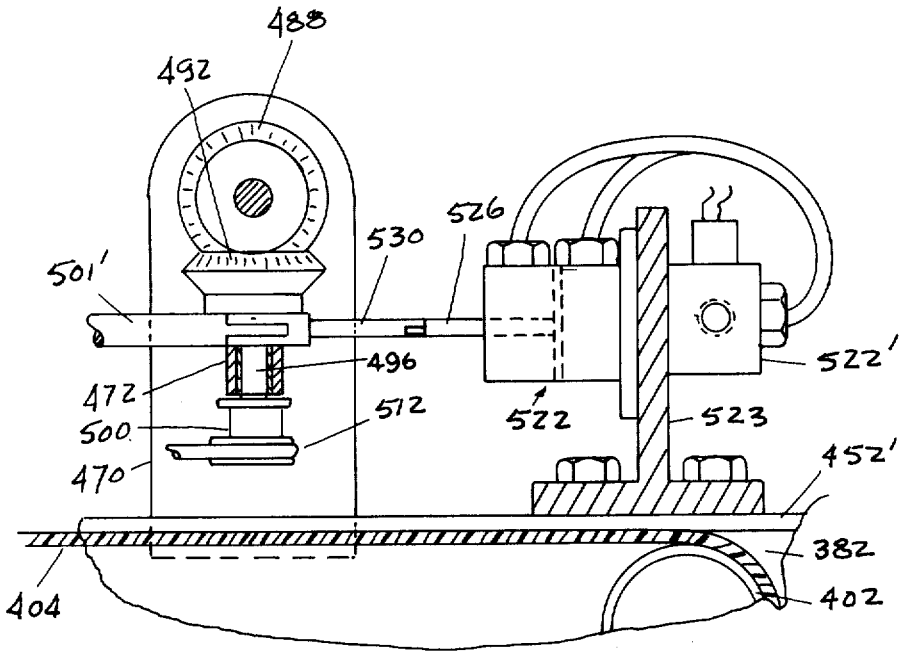
FIG. 24 is a cross-sectional view taken along Lines 24—24 of FIG. 21.

The distribution table 332 is positioned in the conveyor lines 16 and 18 at station b prior to the entrance of the conveyors into the boxer unit 14. FIGS. 21, 22 and 23 disclose a top view, side view and end elevation view of the distributor table 332. The table has a frame 334 which includes four upright legs 336, 338, 340 and 342 with upper and lower horizontal side frame members 344 and 346 extending between legs 338 and 340 and horizontal frame members 348 and 350 extending between legs 336 and 342, horizontal frame members 352 and 354 extend between vertical legs 336 and 338 while horizontal end members 356 and 358 extend between legs 340 and 342. A plate 360 is positioned between horizontal members 346 and 350 and carries a gear box 362 having a drive motor 364 connected thereto.

The gear box shaft 366 carries a sprocket 368 which has a link chain 370 engaging it. The link chain extends upwardly and engages another sprocket 372 carried on conveyor roller shaft 374. The conveyor roller shaft 374 extends through and is suitably journaled in bearing housings 376 and 378. The bearing housings are secured to side plates 380 and 382 which are, in turn, secured to the frame by a plurality of angle brackets 384, 386, 388 and 390 which are attached to the top of legs 338, 340, 336 and 342, respectively. Carried on the shaft 374 is a conveyor roll cylinder 402 which has a conveyor belt 404 engaging it and extending horizontally to a second conveyor roll cylinder 406 which has a shaft carried in bearing housings 408 and 410. These bearing housings are also secured to side plates 380 and 382, respectively. Slots are provided in the side plates 380 and 382 to permit the bearing housings 408 and 410 to be adjusted horizontally to permit proper tensioning of the conveyor belt 404. Adjustment screws 412 (not shown in bearing 410 as viewed in FIG. 21) secured to the side plates 380 and 382 are provided to engage each bearing housing so that they may be moved horizontally and held.

As can be seen in FIG. 22, the conveyor belts 16 and 18 pass underneath the conveyor belt 404 of the distribution table. Four pairs of rollers direct the conveyor belts 16 and 18 vertically, then horizontally, then vertically and finally, horizontally. The conveyor belts 16 and 18 pass onto channels 414 and 416 which are attached to the existing structure of the conveyor frame and over a pair of rollers 418 and 420. Rollers 418 and 420 direct the belts vertically downward where they pass underneath and engage a pair of rollers 422 and 424 (not shown) which are suitably secured to the table frame 334. The belts 16 and 18 then extend horizontally to a pair of rollers 426 and 428 (not shown) whereupon the belts are directed upwardly to rollers 430 and 432. Upon engaging rollers 430 and 432, the belts 16 and 18 are again directed horizontally and continue to the boxer unit 14. The conveyor belts 16 and 18 are continuous belts and, therefore, the belts have a return leg which engages a set of paired rollers which are located below each of the paired rollers listed above, as can be seen in FIG. 22. The combined roller sets permit the belts to bypass and be directed beneath the distribution table conveyor belt 404.

The packages entering on the conveyor belts 16 and 18 pass through channels 414 and 415 which have side rails 450, 450', 452 and 452' which are secured to the bottom plates of the channels. On one side of the channels and positioned above the guide rails 450 and 452 are pinch bars 454 and 456 which are moved horizontally by a spring-loaded solenoid unit 458 and 460. These pinch bar solenoid units are similar to the pinch bar stops 276 and 380 used at the entrance end of the accumulators. The pinch bars are held in a retracted position clear of the conveyor channel by the spring; however, when the solenoids are energized, the pinch bars 454 and 456 are moved inwardly to engage the packages as they move down the conveyor lines. When energized, the pinch bars hold the packages at the entrance of the distribution table to permit alignment conveyors 462 and 464 located along the sides of the distribution table to be operated.

The alignment conveyors 462 and 464 are positioned just forward of the end of the guide rails 450 and 452. These alignment conveyors are carried by a support bracket 466 which has side member 468 and 470 that are secured to side plates 380 and 382. A cross member 472 extends between side members 468 and 470 and is transverse to the direction of movement of the conveyor belt 404. Secured within the top end of the side members 468 and 470 are bearings 474 and 476 which receive a shaft 478. The right end of the shaft 478, as viewed in FIG. 23, extends through the bearing 476 and has a sprocket 480 secured thereto. The sprocket is engaged by a chain 482 which, in turn, engages a sprocket 484 carried on the end of roller conveyor shaft 474. This sprocket and chain arrangement is used to drive the alignment conveyors 462 and 464 through the distribution table conveyor drive system. Positioned adjacent each of the side plates 468 and 470 on the shaft 478 are bevel gears 486 and 488. These bevel gears engage vertically positioned bevel gears 490 and 492 which are carried on shafts 494 and 496 that extend through and are suitably journaled in cross member 472. Secured to the bottom of shafts 494 and 496 are circular belt pulleys 498 and 500. L-shaped support bars 501 and 501' are positioned between the cross bar 472 and the bevel gears 490 and 492, respectively. The long leg of the L-shaped support bar extends forward and rests on a support rod 503 which is secured to the side plates 380 and 382. The L extends transverse to the direction of the conveyor belt 404. Carried on the end of bars 501 and 501' and depending therefrom are stud shafts 502 and 504 (not shown) which, in turn, have circular belt pulleys 506 and 508 journaled thereon. Each pair of pulleys 498 and 506 and 500 and 508 are encircled by a circular belt 510 and 512, respectively. Just beyond the end of the alignment conveyors are exit guide rails 512 and 516 for conveyor lane 16 and guide rails 518 and 520 for conveyor lane 18. The alignment conveyor shafts 494 and 496 are mounted in the cross bar 472 so that they can be pivoted across the distribution table, whereby the free end of the alignment conveyor 462 will swing from a position aligned with guide rails 450 and 512 along the conveyor lane 16 to a position adjacent the end of guide rail 518 along conveyor lane 18. Alignment conveyor 464 will swing between a position aligned with guide rails 452 and 520 to a position adjacent the end of guide rail 516. The alignment conveyors are pivoted by a pair of air cylinders 521 and 522 which are operated by solenoid air valves 521' and 522', each of which is secured to a bracket 523 positioned in front of the alignment conveyor bracket 466. Solenoids are electrically connected to the distribution table control circuits and to a pressurized air source. The piston rods 524 and 526 of the air cylinders are pivotedly connected to links 528 and 530 which are, in turn, fixedly secured to the short legs 532 and 534 of the L-shaped support bars 501 and 501'.

When the solenoids 521' and 522' are de-energized, the alignment conveyors are positioned on the side of the distribution table; but, if it becomes necessary to divide the packages coming onto the distribution table between the conveyor lanes 16 and 18, one of the solenoids will be energized, thus, causing pressurized air to be directed into the appropriate side of the air cylinder and moving the piston rod to rotate the alignment conveyor associated with that particular air cylinder to its diagonal position across the distribution table, as explained hereinabove. The packages coming down, for instance, conveyor lane 16 will be directed on the table and onto the output of conveyor lane 16.

Figure 25:
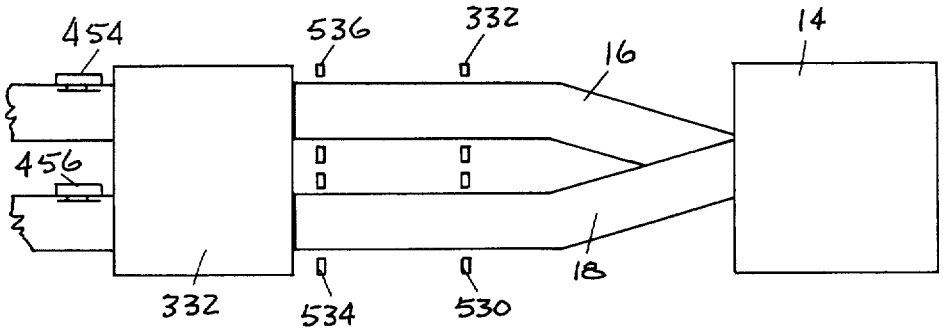
FIG. 25 is a plan view of a portion of the package handling system showing the backlog detection system between the distribution table and the boxer unit according to the present invention.

The distribution table operates under two conditions. The first condition would be if one of the packers is down and its associated accumulator is empty; the second condition would be if one of the packers is operating at a slower rate than the other causing a backlog on the conveyor lines beween the boxer unit and the distribution table. If a packer is down and the associated accumulator is empty, the limit switch 328 is operated by the magazine 244 of the accumulator and a signal is sent to close lane stop 456 to hold any stray packs coming down from the accumulator 182 along conveyor 18. A first timer causes a time delay and lane stop 554 on conveyor 16 is energized to stop packages from entering the distribution table. A second timer is energized causing a second time delay to permit packages already on the distribution table to pass. After the second timer has run down, a spring return electrically operated air solenoid valve 521' is energized and air is provided to the air cylinder 521 to swing the alignment conveyor 462 across the table to direct the packages from conveyor 16 to conveyor 18. After another time delay, the lane stop 554 is opened and the packages coming down conveyor 16 are diverted to the output lane of conveyor 18. The time delay of between 15 to 20 seconds is provided at which time, the lane stop 554 is again operated to hold the packages while the spring return on the electrically operated solenoid air valve 521 causes air to be introduced into the opposite side of the air cylinder 521', thus, returning the alignment conveyor 462 back to its original position. This sequence continues at 15 to 20 second intervals. If the packer, which has gone down, begins functioning again, the distribution cycle is completed and both lane stops are again opened. Another condition which causes the distribution table to begin functioning is when one packer is functioning at a slower rate than the other causing a backlog on one of the conveyor lines. FIG. 25 discloses a portion of the package handling system showing the backlog detection system between the distribution table 332 and the boxer 14. Two sets of photocells of the light source receiver type are positioned to view across the conveyors 16 and 18 at two different points along the conveyor line between the boxer and the distribution table. The first set of photocells 530 and 532 detect a backlog while the second set of photocells 534 and 536 are utilized to shut the packer down to prevent the packages from backing up onto the distribution table. If either photocell 530 or 532 is blocked for a specified period of time, both lane stops 454 and 456 operate and a time delay is used to allow the packages to clear the distribution table 332. Then the alignment conveyor on the particular conveying line in which the photocell is blocked, is operated as described above so that packages are directed to the lane with no backlog. The lane stop of the backlog lane is then released to permit the packages to pass. The other lane stop, however, is maintained closed. The sequence of operation is the same as if a packer was down and operates at 15 to 20 second intervals. When the backlog is dissipated and photocells 530 and 532 are clear, the distribution table returns to its normal operation and lane stops 454 and 456 are deenergized to permit the packages to pass through the distribution table. If the backlog is of such proportion that the packages block either the photocells 534 and 536 near the edge of the distribution table, the packer feeding the respective lane is shut down to prevent the packages from backing up on the table.

It can be seen from the above-described preferred embodiment that the present invention provides an apparatus which will inspect a package for faults in packaging and formation and reject improperly formed packages. Furthermore, the invention also provides an apparatus which will permit inter-connected packers and boxers to operate on a continual basis if one of the other machines ceases to function for a specific period of time by providing an accumulator and a distribution table.

The described embodiment can be modified in numerous ways as will be apparent from the foregoing. For example, it is within the skill of the art to change the drive systems for the particular apparatus or to change the number and position of the various inspection photocells so that they will conform to the particular type of package to be inspected; however, these and other variations and changes can be made in the invention as above described and illustrated without departing from the true spirit and scope thereof as defined in the following claims.

What is claimed is:

[1. An accumulator for use on an inter-connecting conveyor between a packaging machine and a cartoning machine comprising:

(a) a frame;

(b) a magazine mounted for movement on said frame for receiving and storing packages from said conveyor, said conveyor passing through said magazine; and (c) means for varying the position of said magazine with respect to said conveyor so that packages can be selectively removed from and deposited on said conveyor.]

2. The accumulator of claim [1] *29*, wherein said magazine includes:

(a) spaced, parallel, first and second side plates;

(b) spaced, parallel, top and bottom plates disposed between said side plates, said side, top and bottom plates forming an enclosure having its ends open so that said conveyor can pass therethrough; and (c) a plurality of protrusions extending inwardly from each side plate, said protrusions on one side plate corresponding with protrusions on the other side plate to form flights, the end of the protrusions on the side plates being spaced from one another forming a gap through which said conveyor passes.

3. The accumulator of claim 2, wherein said means for varying the position of said magazine includes:

(a) drive means for moving said magazine perpendicular to said conveyor; and (b) means for controlling the operation of said drive means of said magazine.

4. The accumulator of claim 3, wherein said drive means for said magazine include:

(a) a threaded shaft secured to said frame and suitably journaled therein;

(b) a threaded collar secured to said magazine and threaded into said threaded shaft; and (c) means for rotating said threaded shaft in both a clockwise and counter-clockwise direction, whereby said magazine will move perpendicular to said conveyor.

5. The accumulator of claim 4, wherein said means for rotating said threaded shaft include:

(a) a first bevel gear secured to one end of said threaded shaft;

(b) a gear shaft journaled in said frame perpendicular to said threaded shaft;

(c) second and third bevel gears carried on said gear shaft meshing with said first bevel gear;

(d) first and second clutch means associated with said second and third bevel gears, respectively, and carried on said gear shaft; and (e) motor means for driving said gear shaft, said first and second clutch means being energized selectively to cause said second and third bevel gears to rotate said first bevel gear in a clockwise and counter-clockwise direction.

[6. The accumulator of claim 1, wherein said means for varying the position of said magazine includes:

(a) drive means for moving said magazine perpendicular to said conveyor; and (b) means for controlling the operation of said drive means for said magazine.]

[7. The accumulator of claim 6, wherein said drive means for moving said magazine includes:

(a) a threaded shaft secured to said frame and suitably journaled therein;

(b) a threaded collar secured to said magazine and threaded into said threaded shaft; and (c) means for rotating said threaded shaft in both a clockwise and counter-clockwise direction whereby said magazine will move perpendicular to said conveyor.]

8. The accumulator of claim [7] *5*, further including:

(a) at least one guide shaft secured to said frame; and (b) a guide bracket secured to said magazine, said guide bracket carrying a guide collar through which said guide shaft extends.

[9. The accumulator of claim 6, wherein said means for controlling the operation of said drive means includes:

(a) means for detecting the full/empty status of the flights of said conveyor aligned with said conveyor and energizing said magazine drive means;

(b) means for selectively activating and de-activating the flight status detecting means; and (c) means for de-energizing said magazine drive means at each flight.]

[10. The accumulator of claim 9, wherein said flight status detecting means includes:

(a) first and second photocell means secured to said frame at the level of said conveyor, said first photocell being located at the entrance end of said magazine and said second photocell being located at the exit end of said magazine, each photocell means detecting the presence of a package when the status of the conveyor flight is full; and (b) a third photocell maintaining its light source and receiver unit secured to said frame at opposite ends of said magazine, whereby the line of sight of said third photocell is diagonally through the magazine along the conveyor to detect the absence of packages when the status of the conveyor flight is empty.]

[11. The accumulator of claim 10, wherein said means for selectively activating and de-activating the flight status detecting means includes:

(a) means for detecting the operating status of said packaging and cartoning machines;

(b) exit stop means on said conveyor near the exit end of said magazine for blocking said conveyor when said cartoning machine becomes inoperative and activating said first and second photocells of said flight status detecting means to initiate an accumulator load sequence;

(c) entrance stop means on said conveyor near the entrance end of said magazine for blocking said accumulator when said packaging machine becomes inoperative and activating said third photocell means of said flight status detecting means to initiate an accumulator unload cycle, and (d) means for de-energizing said flight status detecting means in response to the machine operating status detecting means.]

12. The accumulator of claim [11] *29*, wherein said means for de-energizing said magazine drive means includes:

(a) flight level photocell means having its light source and receiver units secured to said frame, said flight level photocell means being located so that the line of sight between the light source and the receiver unit corresponds to the level of said conveyor; and (b) a flight level member secured to the side of said magazine and extending perpendicular to the line of sight of said flight level photocell means, said flight level member having a plurality of apertures, each aperture corresponding to a flight in said magazine, each flight level member passing between the light source and receiver unit of said flight level photocell, thereby selectively blocking and permitting the receiver of said flight level photocell to be energized by said light source.

[13. A package inspection and handling system for use with a packaging machine inter-connected to a cartoning machine by a conveyor comprising:

(a) means for detecting an imperfectly formed package and producing an output signal if such imperfectly formed package exists;

(b) means associated with said detecting means for receiving said output signal and rejecting said imperfectly formed package; and (c) an accumulator means associated with said conveyor, said accumulator means having a frame, a magazine mounted for movement on said frame for receiving and storing packages from said conveyor, said conveyor passing through said magazine; and means for varying the position of said magazine with respect to said conveyor at selected times so that the packages can be removed from and deposited on said conveyor.]

[14. The system of claim 13, wherein said magazine includes:

(a) spaced, parallel first and second side plates;

(b) spaced, parallel top and bottom plates disposed between said side plates, said side, top and bottom plates forming an enclosure having its ends open so that said conveyor can pass therethrough; and (c) a plurality of protrusions extending inwardly from each side plate, said protrusions on one side plate corresponding with the protrusions on the other side plate to form flights, the ends of the protrusions on the side plates being spaced from one another, forming a gap through which said conveyor passes.]

[15. The system of claim 14, wherein said means for varying the position of said magazine includes:

(a) drive means for moving said magazine perpendicular to said conveyor; and (b) means for controlling the operation of said drive means for said magazine.]

[16. The system of claim 15, wherein said drive means for moving said magazine includes:

(a) a threaded shaft secured to said frame and suitably journaled therein;

(b) a threaded collar secured to said magazine and threaded onto said threaded shaft; and (c) means for rotating said threaded shaft in both a clockwise and counter-clockwise direction, whereby said magazine will move perpendicular to said conveyor.]

[17. The system of claim 16, wherein said means for rotating said threaded shaft includes:

(a) a first bevel gear secured to one end of said threaded shaft;

(b) a gear shaft journaled in said frame perpendicular to said threaded shaft;

(c) second and third bevel gears carried on said gear shaft and meshing with said first bevel gear;

(d) first and second clutch means associated with said second and third bevel gears, respectively, and carried on said gear shaft; and (e) motor means for driving said gear shaft, said first and second clutch means being energized selectively to cause said second and third bevel gears to rotate said first bevel gear in a clockwise and counter-clockwise direction.]

[18. The system of claim 13, wherein said means for varying the position of said magazine includes:

(a) drive means for moving said magazine perpendicular to said conveyor; and (b) means for controlling the operation of said drive means for said magazine.]

[19. The system of claim 18, wherein said drive means for moving said magazine includes:

(a) a threaded shaft secured to said frame and suitably journaled therein;

(b) a threaded collar secured to said magazine and threaded onto said threaded shaft; and (c) means for rotating said threaded shaft in both a clockwise and counter-clockwise direction whereby said magazine will move perpendicular to said conveyor.]

[20. The system of claim 19, further including:

(a) at least one guide shaft secured to said frame; and (b) a guide bracket secured to said magazine, said guide bracket carrying a guide collar through which said guide shaft extends.]

[21. The system of claim 18, wherein said means for controlling the operation of said drive means includes:

(a) means for detecting the full/empty status of the flight of said magazine aligned with said conveyor and energizing said magazine drive means;

(b) means for selectively activating and de-activating the flight status detecting means; and (c) means for de-energizing said magazine drive means at each flight.]

[22. The system of claim 21, wherein said flight status detecting means includes:

(a) first and second photocell means secured to said frame at the level of said conveyor, said first photocell being located at the entrance end of said magazine and said second photocell being located at the exit end of said magazine, each photocell means detecting the presence of a package when the status of the conveyor flight is full; and (b) a third photocell means having its light source and receiver unit secured to the frame at opposite ends of said magazine, whereby the line of sight of said third photocell is diagonally through the magazine along the conveyor to detect the absence of packages, when the status of the conveyor flight is empty.]

[23. The system of claim 22, wherein said means for selectively activating and de-activating the flight status detecting means includes:

(a) means for detecting the operating status of said packaging and cartoning machines;

(b) exit stop means on said conveyor near the exit end of said magazine for blocking said conveyor when said cartoning machine becomes inoperative and activating said first and second photocell means of said flight status detecting means to initial an accumulator load sequence;

(c) entrance stop means on said conveyor near the entrance end of said magazine for blocking said conveyor when said packaging machine becomes inoperative and activating said third photocell means of said flight status detecting means to initiate an accumulator unload cycle; and (d) means for de-energizing said flight status detecting means in response to the machine operating status detecting means.]

[24. The system of claim 23, wherein said means for de-energizing said magazine drive means includes:

(a) flight level photocell means having its light source and receiver unit secured to said frame, said flight level photocell means being located so that the line of sight between the light source and the receiver unit corresponds to the level of said conveyor; and (b) flight level member secured to the side of said magazine and extending perpendicular to the line of sight of said flight level photocell means, said level member having a plurality of apertures, each aperture corresponding to a flight in said magazine, said flight level member passing between the light source and receiver unit of said flight level photocell, thereby selectively blocking and permitting the receiver of said flight level photocell to be energized by said light source.]

25. A package inspection and handling system for use with two packaging machines connected by a first and second conveyor to a single cartoning machine comprising:

(a) a means for detecting an imperfectly formed package and producing an output signal if such imperfectly formed package exists;

(b) means associated with the said detecting means for receiving said output signal and rejecting said imperfectly formed package; and (c) accumulator means associated with said conveyors for removing and depositing packages from said conveyors at selected times; and (d) a distribution table located between said packing machines and said cartoning machine for maintaining the cartoning machine in operation when one of the packing machines becomes inoperative by dividing the packages from the remaining packing machine still in operation.

26. The system of claim 25, wherein said distribution table includes:

(a) a frame;

(b) a table conveyor carried in said frame and having first and second lanes corresponding to said first and second conveyors from said packaging machine;

(c) a first and second alignment conveyor means located adjacent said first and second lanes for diverting packages from said first lane to said second lane or vice versa;

(d) means for selectively operating said first and second alignment conveyor means; and (e) drive means for said table conveyor and said first and second alignment conveyor means.

27. A distribution table for use in a package handling system in which a first and second packaging machine supply a single cartoning machine along first and second conveyors, said distribution table being located between said first and second packaging machines and said cartoning machine comprising:

(a) a frame;

(b) a table conveyor carried in said frame having first and second lanes corresponding to said first and second conveyors;

(c) first and second alignment conveyors located adjacent said first and second lanes for diverting packages from said first lane to said second lane or vice versa;

(d) means for selectively operating said first and second alignment conveyor means; and (e) drive means for said table conveyor and said first and second alignment conveyor means.

28. The system of claim 27, further including at least one means for detecting a backlog on one of the conveyors between said distribution table and cartoning machine and energizing said distribution table to divert the packages from the backlog conveyor to the other conveyor.

*29. An accumulator for use on an interconnecting conveyor between a packaging machine and a cartoning machine comprising:*

*(a) a frame*

*(b) a magazine having a plurality of flights mounted for movement on said frame for receiving and storing packages from said conveyor, said conveyor passing through a part of said magazine;*

*(c) drive means for moving said magazine with respect to said conveyor;*

*(d) a flight status detecting means including a first and second sensing means adjacent to said conveyor, said first sensing means being located before the entrance end of said magazine and said second sensing means being located after the exit of said magazine, each sensing means detecting the presence of a package and said first sensing means detecting a full flight during the loading operation of said accumulator and the second sensing means determining the absence of packages indicating an empty flight during the unloading operation of said accumulator;*

*(e) means for selectively activating and deactivating said flight status detecting means; and*

*(f) means for de-energizing said drive means at each flight of said magazine.*

*30. The accumulator of claim 29, wherein said means for selectively activating and de-activating said flight status detecting means includes machine operating status means for detecting the operating status of said packaging and cartoning machine and providing a signal to a first stop means located after the exit of said magazine for blocking said conveyor and activating the flight status detecting means loading sequence.*

*31. The accumulator of claim 30, wherein said means for selectively activating and de-activating said flight status detecting means further includes a second stop means located before the entrance to said magazine for blocking said conveyor and activating said flight status detecting means unloading sequence.*

*32. The accumulator of claim 31, further including means for de-energizing said flight status detecting means in response to the machine operating status means.*

* * * * *